US006137563A

United States Patent [19]

Agano

[11] Patent Number: 6,137,563

[45] Date of Patent: Oct. 24, 2000

[54] APPARATUS FOR RECORDING IMAGES

[75] Inventor: Toshitaka Agano, Kanagawa, Japan

[73] Assignee: Fuji Photo Film Co., Ltd., Kanagawa, Japan

[21] Appl. No.: 09/137,831

[22] Filed: Aug. 21, 1998

[30] Foreign Application Priority Data

Aug. 21, 1997 [JP] Japan .................................... 9-225132

[51] Int. Cl.[7] ............................ G03B 27/00; G03B 27/52

[52] U.S. Cl. ............................................... 355/405; 355/27

[58] Field of Search .................................. 355/27, 28, 29, 355/40, 41, 405; 358/498, 400, 401; 347/187

[56] References Cited

U.S. PATENT DOCUMENTS

| | | | |
|---|---|---|---|
| 4,505,574 | 3/1985 | Kurata et al. | 355/14 E |
| 4,571,061 | 2/1986 | Osanai et al. | 355/8 |
| 4,737,822 | 4/1988 | Taniguchi et al. | 355/27 |
| 5,079,598 | 1/1992 | Kaneko et al. | 355/309 |
| 5,126,781 | 6/1992 | Tomizawa et al. | 355/27 |
| 5,128,709 | 7/1992 | Nagumo et al. | 355/27 |
| 5,151,714 | 9/1992 | Okino et al. | 346/108 |
| 5,796,496 | 8/1998 | Ono | 358/498 |

FOREIGN PATENT DOCUMENTS 9530934 11/1995 WIPO .

9531754 11/1995 WIPO .

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

Disclosed is an apparatus for forming images on dry-processable recording materials, including heat-developable photosensitive recording materials and light- and heat-sensitive recording materials, wherein an exposed recording material is transported into a heat development section and brought into conduct with a heating drum to undergo heating to form an image. In continuous development, when an image recording material having a size different from that of the lastly developed material is ready to be carried in the development section, the transport of the recording material to be developed is suspended and the recording material has a wait of a predetermined standby time. During this waiting period also, the heating drum is left as it revolves and the heat source is left as it evolves heat. As a result, the surface temperature of the heating drum restores the predetermined temperature and the temperature distribution thereof becomes stationary, and thereby the generation of development streaks is reduced.

7 Claims, 3 Drawing Sheets

APPARATUS FOR RECORDING IMAGES

FIELD OF THE INVENTION

The present invention relates to an apparatus for recording images on dry-processable recording materials and developing them, wherein heat developable photosensitive materials or light- and heat-sensitive recording materials are used as the recording materials.

BACKGROUND OF THE INVENTION

Hitherto, a wet system of reproducing images by wet processing after photographing or recording on silver halide photographic light-sensitive materials has been adopted in an apparatus for recording images for medical use, e.g., CT (computer tomography), MRI (magnetic resonance imaging) or the like.

As opposed to such a wet system, a recording apparatus adopting a dry system free from wet processing has received much attention in recent years. In such an apparatus, for instance, films of a recording material sensitive to both light and heat (a light- and heat-sensitive recording material) or a heat-developable photosensitive material (these films are referred to as "recording films" hereinafter) have been used.

In such an apparatus for recording on heat-developable photosensitive materials, the recording films are irradiated with (exposed to) laser beams to form latent images therein, and then heated to produce or develop colors. The exposure operation therein is generally carried out by scanning laser beams (main scan) while controlling the output of laser beams in accordance with image data. Synchronously with the main scan, it is proper that the recording film under exposure be moved in the prescribed direction (side scan). And the development or the color production is generally effected by passing the exposed recording films through a heating device.

Additionally, the literature on such an apparatus for recording on heat-developable photosensitive materials includes, e.g., WO 95/31754, WO 95/30934 and so on.

Each time the photographing on a recording film is carried out, the size of the film used is properly chosen depending on the object of photographing (e.g., what part of the body is to be photographed) and so on. Therefore, the recording films fed into the heat development section are sometimes different in size.

As mentioned above, the development is performed by passing each recording film through a heating device. In a case where the heating device uses a heating drum, the temperature of the drum surface becomes lower in the region used for development (the region in which the drum surface is actually in contact with a recording film is hereinafter referred to as "the development region") than in the other region.

If the region used for development is always the same on the heating drum surface, the temperature of the development region is in a semi-stationary state even when plural sheets of recording film are developed continuously; as a result, steady development can be performed. However, in the case of changing the size of a recording film to be exposed, the location, area and shape of the development region become different from-what they are before the size change. As a result, the temperature distribution in the new development region lacks uniformity just after the size change to tend to cause development streaks.

In particular, this problem is serious when the recording film size is changed from small to large. As the recorded images are required to have high quality in the medical filed, recording films of high quality are used therein. However, the recording films capable of producing images of high quality are liable to be influenced by the temperature during heat development, and so they are in a condition to readily generate the foregoing development streaks.

SUMMARY OF THE INVENTION

Therefore, an object of the present invention is to provide an apparatus for recording images on dry-processable recording materials, such as heat-developable photosensitive materials, which hardly causes development streaks even in the images formed after a size change in the recording materials is introduced.

The present invention is made in order to achieve the above-described object and provides an apparatus for recording an image on a heat-developable photosensitive recording material or a light- and heat-sensitive recording material by dry processing, comprising:

latent image-forming means for forming a desired latent image in said recording material;

heat development means for heating said recording material using a heated contact surface that is contactable with said recording material, and developing said recording material;

transporting means for transporting the latent image-formed recording material into said heat development means; and control means for controlling said transporting means and said heat development means;

wherein said control means controls at least one of said latent image-forming means, said heat development means and said transporting means so that the development of said recording material at a present time is carried out after at least a predetermined time passes following completion of development at a last time, when said recording material to be developed at the present time is different in size from the recording material developed at the last time during continuous development of a plurality of recording materials.

In the above-described apparatus for recording an image, said control means further maintains the heated contact surface at the same temperature during the predetermined time.

The foregoing image-recording apparatus can further be equipped with means for detecting the size of said recording material and means for memorizing the detection results obtained by the detecting means, wherein the above-described control means determines whether or not the recording material to be developed at the present time has the same size as the recording material developed at the last time.

It is desirable that the control means carries out the development after the passage of the predetermined time when a contact area of the recording material to be developed at the present time is greater than a contact area of the recording material developed at the last time.

A contact member having the above contact surface may have the form of revolving drum to come into contact with each recording material at the periphery.

DETAILED DESCRIPTION OF THE INVENTION

Figure 1:
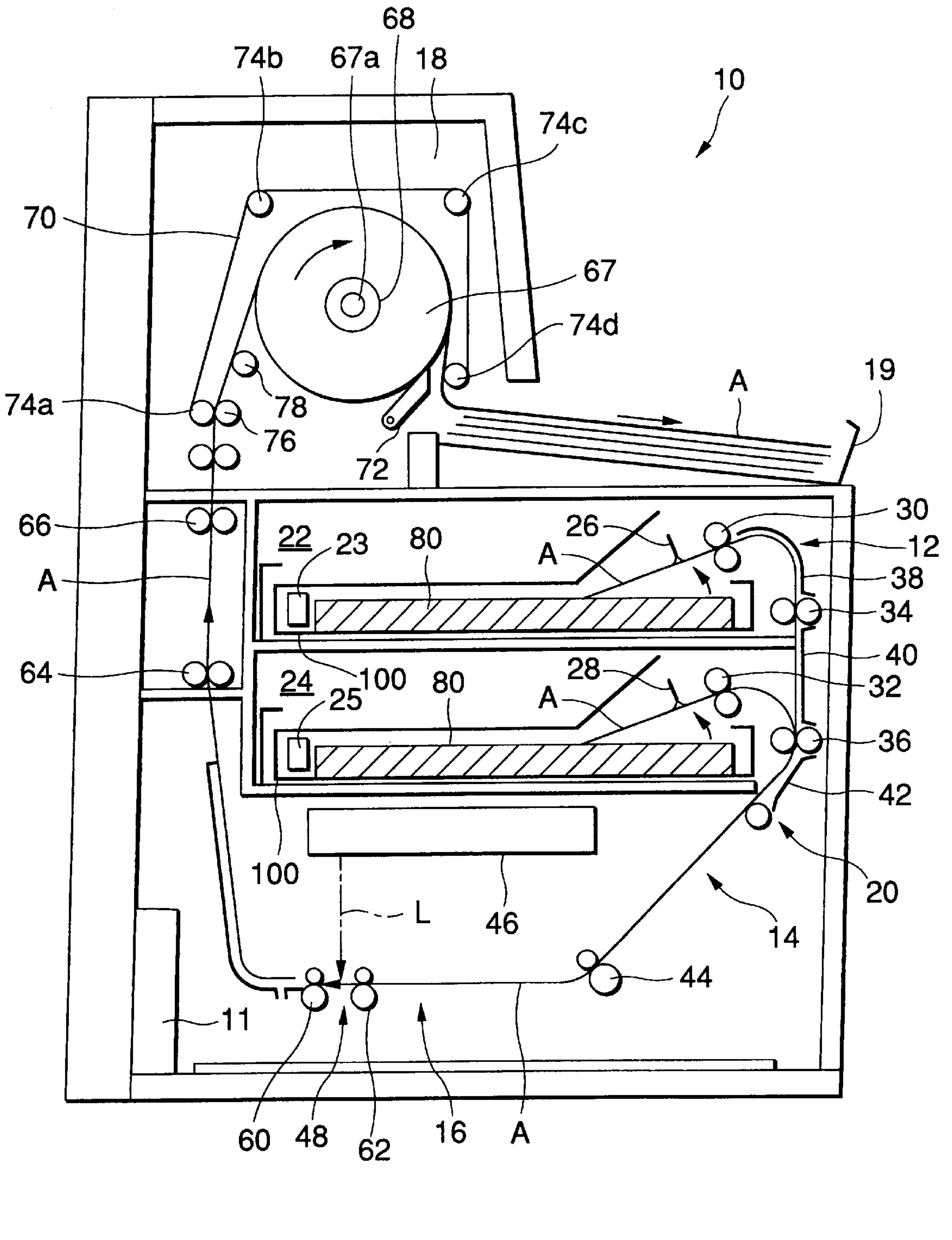
FIG. 1 is a schematic diagram showing the outline of a recording apparatus as one embodiment of the present invention.

The term "a heat-developable photosensitive material" described as a recording material usable in the present invention signifies a recording material on which an image can be recorded by use of at least one beam of light, such as a laser beam (namely, by exposure) and then developed by heating to produce a color. As an example of such a heat-developable photosensitive material, mention may be made of a recording material having on one side of a support an image forming layer which comprises an organic silver salt, a reducing agent therefor and binders at least 50 wt % of which is a latex (this recording material is referred to as "a first recording material" hereinafter).

Also, the term "a light- and heat-sensitive recording material" described as another kind of recording material usable in the present invention signifies a recording material on which an image can be recorded by use of at least one beam of light, such as a laser beam (namely, by exposure) and then developed by heating to produce a color. As an example of such a light- and heat-sensitive recording material, mention may be made of a recording material of the type which has on a support a light- and heat-sensitive recording layer containing an electron-donating colorless dye encapsulated in heat-responsive microcapsules and, outside the heat-responsive microcapsules, a compound having both an electron-accepting part and a polymerizable vinyl monomer part and a photopolymerization initiator (the recording material of this type is referred to as "a second recording material" hereinafter).

As another example of the foregoing light- and heat-sensitive recording material, mention may be made of a recording material of the type which has on a support a light- and heat-sensitive recording layer containing an electron-donating colorless dye encapsulated in heat-responsive microcapsules and, outside the heat-responsive microcapsules, an electron-accepting compound, a polymerizable vinyl monomer and a photopolymerization initiator (the recording material of this type is referred to as "a third recording material" hereinafter).

An embodiment of the present invention is illustrated below by use of drawings.

In the image-recording apparatus as an embodiment of the present invention, visible images are obtained by using heat developable photosensitive materials (hereinafter referred to as "recording materials A") which require no wet process for development, subjecting each of the recording materials A to imagewise exposure by scanning with a beam of light L to form latent images therein, and then performing heat development. The greatest feature of such an embodiment of the present invention consist in that, when there occurs the situation that the development streaks attributable to non-uniformity of the temperature of a heating drum 67, which is described hereinafter, tends to generate (e.g., just after a size change is made between preceding and present recording materials), the recording material to be developed is made to wait a predetermined time for the transport to the heating drum 67 in order to render the temperature of the drum surface uniform, thereby preventing the generation of development streaks.

Now, the structure of an image-recording apparatus 10 as an embodiment of the present invention is illustrated using FIG. 1.

The image-recording apparatus 10 (hereinafter abbreviated as "the recording apparatus 10") is constructed so as to comprise a main control device 11, a recording material-feeding section 12, a sideways register section 14, an imagewise exposure section 16, a heat development section 18, a tray 19 and a transport mechanism 20.

The transport mechanism 20 functions so as to transport each recording material A along a fixed transport path formed inside the recording apparatus 10. Specifically, the transport mechanism 20 is constructed so as to be equipped with pairs of rollers, 34, 36, 44, 64 and 66, a driving motor 21 (shown in FIG. 3) to drive each of these pairs of rollers, and transport guides 38, 40 and 42 which form the transport path. The recording material-feeding section 12, the sideways register section 14, the imagewise exposure section 16, the heat development section 18 and the tray 19 are arranged in the order of description from the upper course side of the transport direction of each recording material A.

The recording material-feeding section 12 (abbreviated as "feeding section 12" hereinafter) functions so that one sheet at a time is taken out of many sheets of recording material A put in a magazine 100 and fed into the sideways register section 14 situated in the lower course of the transport direction (abbreviated as "the lower course" hereinafter). The feeding section 12 is constructed so as to be equipped with loading parts 22 and 24, in each of which a sheet-feed means using a sucker 26 or 28, a pair of feeding rollers 30 or 32 and a size detection sensor 23 or 25 are arranged.

Each of the loading parts 22 and 24 is a part for loading the magazine 100 in which many sheets of recording material A are placed. The recording apparatus 10 as an embodiment of the present invention is equipped with two loading parts 22 and 24. In general the magazines 100 loaded in the loading part 22 and the loading part 24 respectively are different from each other in the size of recording materials put therein. For instance, sheets of a recording material of half size for CT or MRI use may be put in the loading part 22, and those of B-4 size for FCR (Fuji Computed Radiography) use may be loaded in the loading part 24. Additionally, many sheets of each recording material A are superposed on one another and stored in a package 80, and this package 80 and all is put in the magazine 100.

The sheet-feed means which is arranged in each of the loading parts 22 and 24 is designed to take one sheet of recording material A at a time out of the magazine 100 under instructions from the main control device 11 and supply it to each of pairs of feed rollers 30 and 32 arranged in the loading parts 22 and 24 respectively. More specifically, this means is devised so that each of the suckers 26 and 28 adsorbs and holds one sheet of recording material A at a time, and the sucker and all is moved by a known transfer means constituted of a link mechanism (not shown in the drawings), driving motors 27 and 29 (shown in FIG. 3) to drive the link mechanism and so on, thereby transporting the recording material A.

In addition, the loading parts 22 and 24 are equipped with size detection sensors 23 and 25 respectively. These sensors each detect the size setup (width and length) of a recording material A loaded in those parts, and transmit the detection result of the size setup into the main control device 11.

The pairs of feed rollers 30 and 32 are designed so that the recording material A taken out of the magazine 100 by the sheet-feed means is sent out to the transport mechanism (including the pairs of transport rollers 34 and 36). These pairs are made to work by the driving motors 27 and 29 respectively under instructions from the main control device 11.

The recording material A conducted to the transport mechanism by the pair of feed rollers 30 is kept travelling by the transport mechanism even after. More specifically, into the sideways register section 14 situated in the lower course of the transport path, the recording material A conducted by the pair of feed rollers 30 is transported by the pairs of transport rollers 34 and 36 as it is guided by transport guides 38, 40 and 42 and, on the other hand, the recording material A conducted by the pair of feed rollers 32 is transported by the pair of the transport rollers 36 while being guided by the transport guides 40 and 42.

The sideways register section 14 is a section designed to register the recording material A in the direction perpendicular to the transport direction (hereinafter referred to as "the width direction") and thereby effect the so-called side registry, or the register of the recording material A in the direction of the main scan to be carried out in the imagewise exposure section 16 situated in the lower course of the transport path.

Additionally, the recording material A which has undergone the register in the sideways register section 14 is transported to the imagewise exposure section 16 by the transport mechanism (specifically, a pair of transport roller 44).

The imagewise exposure section 16 (hereinafter abbreviated as "exposure section 16") is designed to subject the recording material A to imagewise exposure by scanning with a beam of light. The exposure section 16 in this embodiment is constructed so as to have an exposure unit 46 and a means 48 of transport for the side scan.

Figure 2:
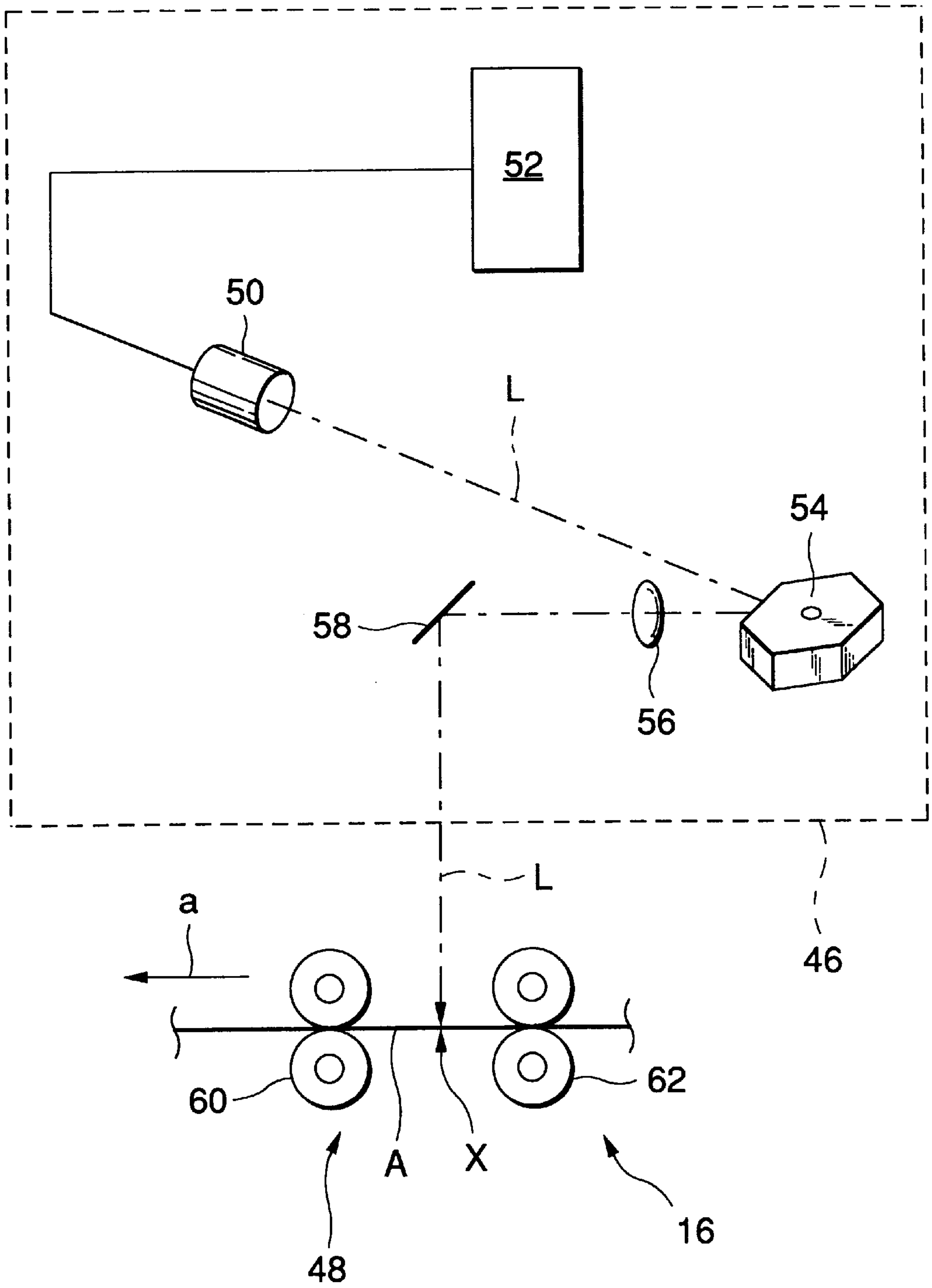
FIG. 2 illustrate the outline of an exposure unit.

The exposure unit 46, as shown in FIG. 2, has a structure such that the beam of light L emitted by a light source 50 is incident upon the predetermined recording position X while being modulated (undergoing pulse-width modulation in this embodiment) depending on a recorded image (image data) by means of a record control device 52 and, at the same time, deflected in the direction of the main scan (the direction perpendicular to the diagram-drawn plane in FIG. 1 and FIG. 2 each) by a polygon mirror 54, an fθ lens 56, a mirror 58 for reflecting light downwards and the like.

The means 48 of transport for the side scan is designed to transport the recording material A by pairs of transport rollers 60 and 62 so as to stay at the recording position X for every main scan as well as to move in the direction of the side scan (the direction of the arrow a in FIG. 2) perpendicular to the direction of the main scan. Such a transport of the recording material A in addition to the deflection of the beam of light L in the direction of the main scan results in two-dimensional scan exposure of the recording material A to a beam of light, thereby recording a latent image on the recording material A. The driving source of the pairs of transport rollers 60 and 62 is also the driving motor 21.

Additionally, the exposure section 16 works following the instructions from the main control device 11, and it is devised so that the recorded image (image data) as the modulation source of the beam of light can be inputted from the outside (e.g., an FCR reader, CT and MRI machines).

The heat development section 18 is designed to develop the latent image formed in a recording material A into a visible image by heating the recording material A, and constructed so as to have a heating drum 67, an endless belt 70, a release nail 72 and transport rollers 76 and 78.

The heating drum 67 is a drum with a built-in heat source 68, and devised so as to heat and maintain the surface thereof at a temperature corresponding to the heat-development temperature of a recording material A. The heat source 68 may be a generally used heater or a light source for heating use, such as a halogen lamp.

Figure 3:
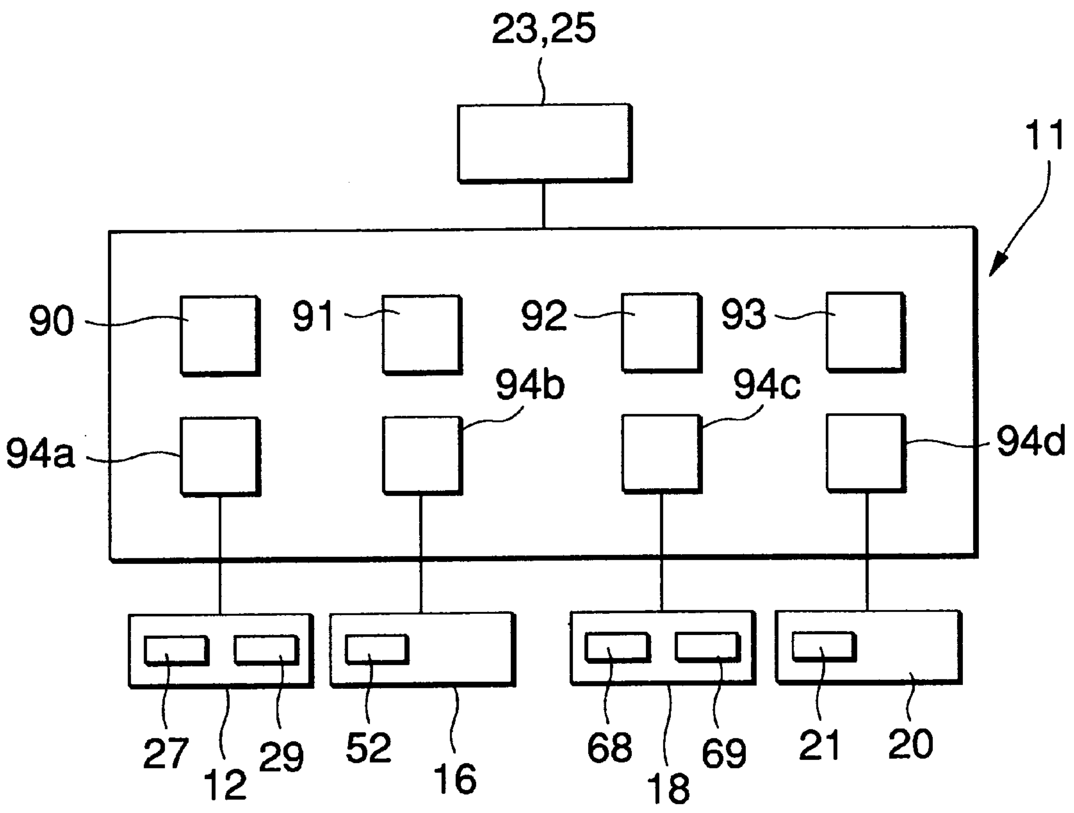
FIG. 3 is a block diagram illustrating the main part of a control system.

The heating drum 67 is made so as to revolve on the axis 67*a*, and arranged so that a recording material A is inserted between the drum 67 and the endless belt 70 and transported by the rotation of the drum 67 driven by a heating drum driving motor 69 (shown in FIG. 3). Further, it is so contrived that the rotation of the heating drum 67 and the heat generating conditions of the built-in heat source 68 are wholly controlled under instructions from the main control device 11.

Additionally, the temperature of the heating drum 67 is set at a proper value depending on the characteristics of a recording material A to be processed. Also, the transport speed of the heating drum 67 (in other words, heat-development time) is determined properly depending on the characteristics of a recording material A to be processed. In the case of using the foregoing first recording material as the recording material A, the proper temperature is from 100° C. to 140° C.; while in the case of using the foregoing second recording material, the proper temperature is from 85° C. to 150° C. The desirable heat-development time is from 10 to 90 seconds in the case of using the first recording material, and from 3 to 60 seconds in the case of using the second recording material.

The endless belt 70 is designed to press a recording material A against the heating drum 67, and laid tight on four rollers 74*a*, 74*b*, 74*c* and 74*d* and wound in a nearly U-shape onto the heating drum 67. As the endless belt 70 separates from the heating drum 67 in the region which the recording material A under travel reaches first, the recording material A can be held between the endless belt in this region and transport rollers 76, 78, and can go on travelling.

The release nail 72 is designed to release a recording material A from the heating drum 67. And it is contrived that the release nail will touch and leave the heating drum corresponding to the transport of the recording material A by the heating drum.

The tray 19 is designed to be loaded with the processed recording material A discharged from the heat-development section 18.

The main control device 11 is designed to have general control over the whole of the recording apparatus 10. The internal structure of the main control device 11 and the main part of the control system of the recording apparatus 10 are shown in FIG. 3.

The main control device 11 comprises ROM90 which houses control data and control program, RAM91 which retains various data and image data, a processor 92, an I/F unit 93 for giving and receiving control signals, image data and the like to and from an external apparatus, and drivers 94 for controlling the drive of individual sections.

The control data to be memorized in ROM90 include the waiting time in the temperature condition restoration processing described hereinafter.

RAM91 houses, for instance, the size data of recording materials A, which are already fed from the feeding section 12 but not yet subjected to development, in the order of feeding. In this case, it is contrived that the RAM 91 can memorize the information on the recording materials by at least the number of sheets present on the transport path from the size detection site (the position at which size detection sensors 23 and 25 are placed in the present embodiment) to the heat-development section 18. The information on the recording materials which have undergone the heat development is deleted as occasion arises. In a case where the apparatus is designed so as to detect the size at the position of a pair of rollers 66, on the other hand, it is sufficient for the present purpose that the size of the last recording material of those having undergone heat development (namely, the information on one sheet of recording material) can be retained in RAM91.

The processor 92 not only executes the control program by reference to control data and so on, but also materializes various functions by operating the foregoing various sections via the drivers 94*a*, 94*b*, 94*c* and 94*d*. For instance, the processor 92 has a function of determining the size of a recording material A to be used for recording the desired image on the basis of the size of image data inputted via the I/F unit 93 and retained in RAM91 (or instructions separately inputted by a user).

Further, the processor 92 has a function of making a judgement as to whether or not the recording material A ready to travel into the heat development section 18 has the same size as the recording material(s) which have already been transported thereinto by reference to the data which are memorized in RAM91 regarding the sizes of some sheets of the recording material already fed from the feeding section 12 and the feeding order of these sheets. Furthermore, it has a function of putting the temperature condition restoration processing into effect in the case of judging the size to be changed. The temperature condition restoration processing is a processing carried out in order to render the surface temperature distribution of the heating drum 67 uniform and restore the temperature high enough for the development. Specifically, this processing consists in that the recording material A to be developed is made to wait a predetermined time (a standby time) for the transport into the heating-development section 18 as the heat source 68 is left to evolve heat and the heating drum is left revolving. In the present embodiment, this standby time is set within the range of 2 to 3 minutes. The control of the standby time is performed by a timer mechanism installed in the main control device. Additionally, this standby time is set at a time longer than the intervals (standard time) at which many sheets of recording material A having the same size are being transported into the heat-development section 18 in the case of continuous development.

The term "latent image-forming means" used in the present invention is materialized by the combination of the exposure section 16 and the main control device 11 in the aforementioned embodiment. The term "heat development means" used in the present invention is materialized by using the heating drum 67, the heat source 68, the heating drum driving motor 69, the main control device and so on in combination. The term "a contacting member" corresponds to the heating drum 67 in the present embodiment, and the expression "a heated contact surface" corresponds to a part of the periphery of the heating drum. The term "a heat source" corresponds to the heat source 68. The term "transporting means" corresponds to the transport mechanism 20 (represented by the pairs of transport rollers 64 and 66, and the driving motor 21 to drive these rollers). The term "control means" corresponds to the main control device 11. The term "a predetermined time" corresponds to the standby time. The expression "an interval of time between a last development and a present development in cases where the recording material to be developed at a present time has the same size as the recording material developed at a last time" corresponds to a standard time. The term "means for detecting the size" corresponds to the size detection sensors 23 and 25. The term "means for memorizing" corresponds to RAM91.

In the next place, operations performed in the present recording apparatus are illustrated.

The main control device 11 determines the sheet sizes of recording materials A to be used on the basis of image data, and these sheet sizes determined are memorized in RAM91 in their order of feeding.

Subsequently, the main control device 11 operates the sheet-feed means, and thereby the sheets of recording materials A having the determined sizes are fed one after another from the feeding section 12. Each of the thus fed sheets of recording materials A is transported to the exposure section 16 by the transport mechanism including the pair of transport rollers 44.

In the exposure section 16, the recording material A fed into this section is irradiated with a laser beam modulated depending on the image data while the laser beam is scanning the recording material A in the direction of the main scan and the recording material A is transported in the direction of the side scan by the means 48 of transport for the side-scan, thereby forming a latent image in the recording material A, and then sent out. The recording material A bearing the latent image formed in the exposure section is transported towards and into the heat-development section 18 by means of pairs of transport rollers 64 and 66. At this time, the main control device 11 judges according to the data retained in RAM91 as to whether or not the recording material A ready to be transported in the heat-development section 18 has the same size as the recording material transported therein at the last time (this operation is referred to as "size comparison judgement" hereinafter). The operations performed hereinafter depend on the result of the size comparison judgement.

In cases where those two recording materials are concluded to have the same size from the result of the size comparison judgement, the recording material A to be developed is transported in the heat-development section 18 without undergoing restoration processing, and developed by heating. More specifically, the recording material A carried in the heat-development section 18 by the pair of transport rollers 66 is transported to the heating drum 67 as it is held between the endless belt 70 and rollers 76, 78, and inserted between the endless belt 70 and the heating drum 67. In these cases, the interval of time from the preceding sending in of the recording material A to the present sending in is set at a standard time.

The recording material A carried in the heat-development section is transported from now on in accordance with the rotation of the heating drum 67; as a result, the latent image formed therein is converted to a visual image by the heat applied by the heating drum 67 (heat development).

When the top of the recording material A reaches the vicinity of a release nail 72, the release nail touches lightly on the heating drum 67, and intervenes between the heating drum 67 and the recording material A to release the recording material A from the heating drum 67. The thus released recording material A is transported to the outside of the apparatus, and discharged into a tray 19.

On the other hand, in cases where the size of the recording material A to be developed is concluded to be different from the last one by the result of the size comparison judgement, the main control device 11 puts the temperature condition restoration processing into effect. More specifically, the transport of the recording material A to be developed is suspended in the region of a pair of transport rollers 66, and has a wait of a predetermined standby time. During this waiting period also, the heating drum 67 is left as it revolves and the heat source 68 is left as it evolves heat. As a result, the surface temperature of the heating drum 67 restores the predetermined temperature and the temperature distribution thereof becomes stationary. In order to avoid a rear-end collision of one recording material A with another, the feeding section 12, the exposure section 16 and the transport mechanism are made to stop operating during the performance of the temperature condition restoration processing.

After the lapse of the foregoing standby time, the main control device 11 operates the pair of rollers 66 and so on, and the sending of the standby recording material A into the heat-development section 18 is resumed. Under these conditions, the surface temperature of the heating drum 67 already restored the predetermined temperature by the temperature condition restoration processing, and the temperature distribution thereof is already in a stationary state. Thus, development streaks do not generate when the temperature distribution in a stationary state is uniform, or by adding some correction when the temperature distribution is in a stationary state but not uniform. Synchronously with the resumption of the sending of the recording material into the heat-development section, the operations of the feeding section 12, the exposure section 16 and so on are resumed.

In the recording apparatus as an embodiment of the present invention, as illustrated above, the development streaks attributable to the non-uniformity and lowering of the surface temperature of a heating drum 67 can be prevented from generating. In particular, the present apparatus can successfully achieve prevention of the development streaks which is liable to generate in the case of making a size change in recording materials A.

In the aforementioned embodiment, the time for effecting the temperature condition restoration processing (i.e., the standby time) is controlled by utilizing a timer mechanism of the main control device 11. However, it is also possible to control the standby time adopting such a system that the heat-development section is equipped with a sensor to detect the angular position (the state of rotation) of the heating drum 67 and the quantity of rotation of the heating drum 67 is controlled on the basis of the results of detection (e.g., rotational frequency) by the sensor. As far as the revolution speed of the heating drum 67 is maintained constant, the control effect achieved by such a system can be equivalent to that produced by using the timer.

In the aforementioned embodiment, the temperature condition restoration processing is carried out over a period of a predetermined standby time. However, it may be contrived that the heat-development section is equipped with a temperature sensor by which the temperature of the heating drum 67 is detected and, at the time when the attainment to the predetermined temperature is confirmed by the detection result of the temperature sensor, the temperature condition restoration processing is finished and the heat development is resumed.

In the aforementioned embodiment, the recording material A stops at the site immediately in front of the heat-development section 18 (the site of a pair of transport rollers 66) during the period of the temperature condition restoration processing. As for the treatment (including the stop position) of the coming recording material A which has a wait for transport to the heat-development section, however, the invention should not be construed as being limited to the foregoing embodiment. Specifically, the constitution of the treatment may be changed properly depending on the transport speed, the length of transport path (from the feeding section 12 to the heat-development section 18 via the exposure section 16), the intervals between the sheets of recording material A under transport, the characteristics of the recording materials A employed, and so on.

For instance, in the case of employing such a structure that the coming recording material A is fed from the feeding section 12 after the heat development of the recording material A previously fed from the feeding section 12 has been concluded, the coming recording material A may be controlled so as not to be taken out of the magazine 100 during the period of the temperature condition restoration processing. By such a control, the image recording conditions (especially the time required for transporting each recording material from the feeding section 12 to the heat-development section 18 via the exposure section 16) can be always maintained constant, whether or not the temperature condition restoration processing is carried out. On the other hand, the apparatus may have such a structure as to stop the coming recording material A immediately in front of the exposure section 16. This structure is suitable for the case where it is necessary for the interval of time between exposure and development operations to be maintained constant.

In the aforementioned embodiment, the transport of the recording material A which has a wait for the sending into the heat-development section 18 is "suspended". However, the term "wait" used herein means the extension of an interval of time between sending operations into the heat-development section 18, but it is not always required to stop the transport of the recording material A. Although a possible measure is conditional on the length of a transport path, the transport speed, the standby time and so on, there is a case where only a reduction of transport speed will suffice for fulfilling the "wait" requirement. Further, as far as a rear-end collision between recording materials can be avoided, the processing (transport and exposure) of succeeding recording materials may be advanced by operating the feeding section 12, the exposure section 16 and transport mechanism even under performance of the temperature condition restoration processing.

In the aforementioned embodiment, the heating by a light source 68 is carried out during the performance of the temperature condition restoration processing. However, when the heating drum 67 having a great thermal capacity is used, it sometimes occurs that only the surface temperature is in a non-uniform state. In such cases, it is not always necessary to continue the heating by the light source 68, and the surface temperature can be rendered stationary by merely allowing the recording material to stand by to cause a delay in the start of development.

In the aforementioned embodiment, the heat-development section 18 is equipped with a heating drum 67. However, the structure of the heat-development section should not be construed as being limited to that employed in such an embodiment. For instance, such a structure as to bring a recording material into contact with a fixed flat heating plate may suffice for achieving the heat development.

In the aforementioned embodiment, the temperature condition restoration processing is carried out only when a size change in recording materials is made. However, even if the recording materials used have the same size, they may have different thermal capacities according to differences in their compositions. Therefore, the temperature condition restoration processing may be carried out when a type change in recording materials is made.

Also, the method for size detection of recording materials and the way to make judgement as to whether or not a recording material to undergo development has the same size as the preceding recording material should not be construed as being limited to those adopted in the foregoing embodiment. For instance, it is possible to adopt a mechanical device for size detection and delay of a predetermined time in the transport of a recording material different in size from the preceding recording material.

The recording materials A are illustrated below in more detail.

A heat-developable photosensitive material (hereinafter referred to as "a first recording material") has on one side of a support an image forming layer which comprise an organic silver salt, a reducing agent therefor and binders at least 50 wt % of which is a latex.

When the first recording material is exposed to light, a photocatalyst present therein, such as light-sensitive silver halide, forms latent image speck. The application of heat thereto enables the silver of ionized organic silver salt to diffuse, and thereby the ionized silver can combine with the latent image speck to be converted to crystallized silver by the action of the reducing agent; as a result, an image is formed.

The organic silver salt contained in the image forming layer of the first recording material is relatively stable to light, but can form a silver image when it is heated up to 80° C. or higher in the presence of an exposed photocatalyst (a latent image formed from light-sensitive silver halide) and a reducing agent. Such an organic silver salt may be in a desalted condition, if desired.

As examples of such an organic silver salt, mention may be made of the silver salts of organic acids, especially the silver salts of long-chain aliphatic carboxylic acids containing 10 to 30 carbon atoms, and the complexes of organic or inorganic silver salts whose ligands have complexation stability constants ranging from 4.0 to 10.0. More specifically, those organic silver salts include silver behenate, silver arachidate, silver stearate, silver oleate, silver laurate, silver caproate, silver myristate, silver palmitate, silver maleate, silver fumarate, silver tartarate, silver linolate, silver butyrate, silver camphorate and so on.

Also, the silver salts of mercapto or thione group-containing compounds and derivatives thereof can be favorably used as the organic silver salts. Examples thereof include the silver salt of 3-mercapto-4-phenyl-1,2,4-triazole, the silver salt of 2-mercaptobenzimidazole, the silver salt of 2-mercapto-5-aminothiadiazole, the silver salts of thioglycolic acids, such as silver S-alkylthioglycolates, the silver salts of dithiocarboxylic acids, such as silver dithioacetate, the silver salts of thioamides, the silver salt of 5-carboxy-1-methyl-2-phenyl-4-thiopyridine, the silver salt of mercaptotriazine and the silver salt of 2-mercaptobenzoxazole.

It is desirable for such organic silver salts to be needle crystals having a minor axis and a major axis. Preferably, the minor axis is from 0.01 to 0.20 μm, and the major axis is from 0.10 to 5.0 μm.

The size distribution among organic silver salt grains is preferably monodisperse. The term "monodisperse" used herein means that, in the measurement of minor axis length and major axis length each, the standard deviation divided by the mean of measured values is 100% or less, expressed in percentage.

For the purpose of obtaining such an organic silver salt in the form of fine grains free from aggregation, it is desirable to prepare a solid fine-grain dispersion using a known dispersing agent, such as polyacrylic acid, polyvinyl alcohol or polyvinyl pyrrolidone.

The solid fine-grain dispersion of an organic silver salt can be prepared according to a known mechanical dispersion method of using a ball mill, a vibration mill or the like in the presence of a dispersing agent.

Besides the mechanical dispersion method, it is also possible to adopt a method in which coarse grains of an organic solvent are first dispersed in an solvent by pH control and then converted to fine grains by pH change in the presence of a dispersing aid.

The appropriate concentration of an organic silver salt is from 0.1 to 5 g/l, preferably from 1 to 3 g/l, based on silver.

The reducing agent for organic silver salts can be any of materials capable of reducing silver ion to metallic silver, preferably organic substances. Specifically, the reducing agents known to be used for recording materials utilizing organic silver salts, such as those described by JP-A-57-82829, JP-A-6-3793 (the term "JP-A" as used herein means an "unexamined published Japanese patent application") and U.S. Pat. No. 5,464,738, can be used in the present invention also.

Examples of such a reducing agent include amidoximes, such as phenylamidoxime; azines, such as 4-hydroxy-3,5-dimethoxybenzaldehyde azine; hydroxamic acids, such as phenylhydroxamic acid; α-cyanophenylacetic acid derivatives, such as ethyl-α-cyano-2-methylphenylacetate; bis-β-naphthols, such as 2,2'-dihydroxy-1,1'-binaphthyl; 5-pyrazolones, such as 3-methyl-1-phenyl-5-pyrazolone; reductones, such as dimethylaminohexose reductone; sulfonamidophenol reducers, such as 2,6-dichloro-4-benzenesulfonamidophenol; chromans, such as 2,2-dimethyl-7-t-butyl-6-hydroxychroman; 1,4-dihydropyridines, such as 2,6-dimethoxy-3,5-dicarboethoxy-1,4-dihydropyridine; bisphenols, such as bis(2-hydroxy-3-t-butyl-5-methylphenyl)methane, 2,2-bis(4-hydroxy-3-methylphenyl)propane, 4,4-ethylidene-bis(2-t-butyl-6-methylphenol), 1,1-bis(2-hydroxy-3,5-dimethylphenyl)-3,5,5-trimethylhexane and 2,2-bis(3,5-dimethyl-4-hydroxyphenyl)propane; ascorbic acid derivatives, such as 1-ascorbyl palmitate; and chromanols (tocopherol, etc.). In particular, bisphenols and chromanols are preferred over the others.

In addition to the above-recited ones, conventional photographic developing agents, such as phenidone, hydroquinone and catechol, can be also used to advantage. In particular, hindered phenol reducers are preferable.

Such reducing agents may be added in a state of solution, powder or solid fine-grain dispersion. Additionally, the solid fine-grain dispersion is prepared using a known means of fine grinding (e.g., a ball mill, a vibration ball mill), optionally in the presence of a dispersing aid.

The suitable amount of a reducing agent used is from about 5 mole % to about 50 mole % per mole of silver on the side of the image forming layer. The reducing agent is basically added to the image forming layer, but may be added to another layer on the same side as the image forming layer. In this case, it is desirable to use the reducing agent in an amount greater than the foregoing amount, specifically an amount ranging from 10 to 50 mole % per mole of silver. Further, the reducing agent may be the so-called precursor, or a compound derived therefrom so as to function effectively at the time of development alone.

In the image forming layer of the first recording material, a substance which is converted to a photocatalyst by exposure to light, e.g., light-sensitive silver halide (hereinafter abbreviated as "silver halide") is contained.

The silver halide used in the first recording material has no particular restriction on halide composition, so that it may be any of silver chloride, silver chlorobromide, silver bromide, silver iodobromide, silver iodochlorobromide and silver iodide. However, silver bromide or silver iodobromide can be used to advantage.

It is desirable for the silver halide to have a grain size of 0.20 μm or smaller from the viewpoint of preventing the recording material from becoming clouded after the image formation. In particular, the silver halide having a cubic or tabular grain shape is preferred.

Further, it is desirable for the silver halide grains to contain at least one metal complex selected from the group consisting of rhodium complexes, rhenium complexes, ruthenium complexes, osmium complexes, iridium complexes, cobalt complexes, mercury complexes and iron complexes in an amount of from about 1 nmole to about 10 mmole per mole of silver. Those complexes are described in detail in JP-A-7-22549.

Additionally, the metal complexes as mentioned above may be incorporated uniformly in each silver halide grain or in a higher concentration in the core or shell part of each silver halide grain. There is no particular restriction on the way of incorporating those metal complex, though.

Furthermore, it is desirable that the silver halide grains used in the recording material be chemically sensitized.

In chemically sensitizing the silver halide grains, any of known methods may be used. Examples of a usable method include a sulfur sensitization method, a selenium sensitization method and a tellurium sensitization method using diacyl tellurides, bis(oxycarbonyl)telluride or so on, a precious metal sensitization method using chloroauric acid, potassium chloroaurate or so on, and a reduction sensitization method using ascorbic acid, thiourea dioxide or so on.

Also, it is possible to adopt a method of ripening silver halide grains as the emulsion thereof is maintained at pH 7 or above or pAg 8.3 or below, or the sensitization method utilizing the reduction by introducing the period of single addition of silver ion into the process of grain formation.

It is desirable that the thus sensitized silver halide grains be used in an amount of 0.01 to 0.5 mole per mole of organic silver salt.

In cases where silver halide and an organic silver salt are prepared separately, these constituents can be mixed in various manners and under various conditions. For instance, after their separate preparations are concluded, the silver halide grains and the organic silver salt may be mixed using a high-speed stirrer, a ball mill, a sand mill, a colloid mill, a vibration mill, a homogenizer or the like. Another manner may be adopted, wherein after preparation of silver halide grains the organic silver salt under preparation are admixed with these silver halide grains at a right moment and then the preparation thereof is brought to completion.

As still another example of a suitable method for preparing silver halide grains and mixing them with an organic silver salt, mention may be made of the so-called halidation method, or the method of partially halogenating the silver of an organic silver salt by the use of an organic or inorganic halide. Examples of an organic halide usable therein include N-halogenoimides, such as N-bromosuccinimide, and halogenated quaternary nitrogen compounds, such as brominated tetrabutylammonium. Examples of an inorganic halide usable therein include alkali metal halides, such as lithium bromine and potassium iodide, ammonium halides, such as ammonium bromide, alkaline earth metal halides, such as calciumbromide, and halogen molecules, such as bromine and iodine. The suitable amount of a halide added in halidation is from 1 to 500 mmol per mol of organic silver salt.

The image forming layer of the first recording material, in which the constituents as recited above are incorporated, further contains binders, at least 50 wt % of which is a latex having fine particles of a water-insoluble hydrophobic polymer dispersed in a water-soluble dispersing medium. Further, another layer may have such a binder composition, if needed.

With respect to the dispersed condition of such a latex, the latex may be in various conditions, such as a condition created by emulsifying a polymer in a dispersing medium, a condition created using an emulsion polymerization method or a micelle dispersion method, and a condition of molecular dispersion which polymer molecules themselves assume when they have a hydrophilic partial structure. Further, the latex may have a general uniform structure or the so-called core/shell structure.

For details of such latexes, Synthetic Resin Emulsions, compiled by Taira Okuda and Hiroshi Inagaki, published by Kobunshi Kankokai in 1978, Applications of Synthetic Latexes, compiled by Takaaki Sugimura, Yasuo Kataoka, Soichi Suzuki and Keiji Kasahara, published by Kobunshi Kankokai in 1993, Chemistry of Synthetic Latexes, written by Soichi Muroi, published by Kobunshi Kankokai in 1970, and so on can be referred to.

Examples of a polymer comprised in such a latex include an acrylic resin, a vinyl acetate resin, a polyester resin, a polyurethane resin, a rubber resin, a vinyl chloride resin, a vinylidene chloride resin and a polyolefin resin.

Such polymers may be straight-chain, branched-chain or cross-linked polymers. Further, they may be polymers obtained by polymerizing only one kind of monomer, namely the so-called homopolymers, or copolymers obtained by polymerizing two or more kinds of monomers. These copolymers may be random copolymers or block copolymers.

It is desirable that the number-average molecular weight of those polymers be of the order of 5,000–1,000,000, preferably the order of 10,000–100,000. When the molecular weight of a polymer used is too low, the light-sensitive layer using such a polymer has insufficient mechanical strength; while, when the polymer has too high molecular weight, it cannot provide excellent firm formability.

Examples of a usable copolymer include a copolymer of methyl methacrylate, ethyl methacrylate and methacrylic acid, a copolymer of methyl methacrylate, 2-ethylhexyl acrylate, styrene and acrylic acid, a copolymer of styrene, butadiene and acrylic acid, a copolymer of styrene, butadiene, divinylbenzene and methacrylic acid, a copolymer of methyl methacrylate, vinyl chloride and acrylic acid, and a copolymer of vinylidene chloride, ethyl acrylate, acrylonitrile and methacrylic acid.

In addition, various kinds of commercially produced polymers can also be employed. Examples of such products include an acrylic resin, Cevian A-4635 (produced by Daicel Chemical Industries, Ltd.), a polyester resin, FINETEX ES650 (produced by Dai-Nippon Ink & Chemicals, Inc.), a polyurethane resin, HYDRAN AP10 (produced by Dai-Nippon Ink & Chemicals, Inc.), a rubber resin, LACSTAR 7310K (produced by Dai-Nippon Ink & Chemicals, Inc.), a vinyl chloride resin, G3-51 (produced by Nippon Zeon Co., Ltd.), a vinylidene chloride resin, L502 (produced by Asahi Chemical Industry Co., Ltd.), and a polyolefin resin, Chemipearl S120 (produced by Mitsui Petrochemical Industries, Ltd.).

Those polymers may be used alone, or a blend of at least two of those polymers may be used, if desired.

The suitable average diameter of particles dispersed in a latex is from 1 to 50,000 nm, preferably from 5 to 1,000 nm. The dispersed particles have no particular restriction as to the distribution of particle diameters. Namely, both a latex having a broad distribution of particle diameters and a latex having a monodisperse diameter distribution may be used.

It is desirable for the latex used to have its minimum filming temperature (MFT) in the range of −30° C. to 90° C., preferably 0° C. to 70° C.

In the image forming layer of the first recording material, as mentioned above, at least 50 wt % of the total binders is a latex. In particular, it is preferred that at least 70 wt % of the total binders be a latex.

To the image forming layer, if desired, hydrophilic polymers, such as gelatin, polyvinyl alcohol, methyl cellulose, hydroxypropyl cellulose, carboxymethyl cellulose and hydroxypropylmethyl cellulose, may also be added as far as the proportion thereof is not more than 50 wt % to the total binders. Preferably, the amount of hydrophilic polymers added is not more than 30 wt % to the total binders in the image forming layer.

Further, it is desirable that the dispersed particles (polymer particles) of the latex have an equilibrium water content of at most 2 wt %, preferably at most 1 wt %, under the condition of 25° C. and 60% RH.

In the image forming layer of the first recording material and another layer arranged on the same side of the image forming layer, an additive known to be a color toning agent can be contained, desirably in a proportion of about 0.1 to about 50 mole % per mole of silver, for the purpose of improving the optical density. Additionally, such a color toning agent maybe a precursor derived therefrom so as to function effectively at the time of development alone.

Various toning agents known to be useful for recording materials can be employed in this recording material: with examples including phthalimide compounds, such as phthalimide and N-hydroxyphthalimide; cyclic imides, such as succinimide and pyrazoline-5-one; naphthalimides, such as N-hydroxy-1,8-naphthalimide; cobalt complexes, such as cobalthexamine trifluoroacetate; mercaptanes, such as 3-mercapto-1,2,4-triazole and 2,4-dimercaptopyrimidine; and phthalazinone derivatives such as 4-(1-naphthyl) phthalazinone and metal salts thereof. Such a toning agent is added to a coating solution in a state of solution, powder or solid fine-grain dispersion.

The recording material having the image forming layer as mentioned above may contain a sensitizing dye, if needed, in the image forming layer and/or another layer, desirably in an amount of the order of $10^{-6}$ to 1 mole per mole of silver halide in the image forming layer.

As far as they can adsorb to silver halide grains and spectrally sensitize them in the desired wavelength region, any dyes can be used as sensitizing dyes. Examples thereof include cyanine dyes, merocyanine dyes, complex cyanine dyes, complex merocyanine dyes, holopolar cyanine dyes, styryl dyes, hemicyanine dyes, oxonol dyes and hemioxonol dyes. In the present invention, sensitizing dyes having spectral sensitivities suitable for the spectral characteristics of recording light L are selected from those dyes.

In adding such sensitizing dyes to a silver halide emulsion, they may be dispersed directly to the emulsion, or they may first be dissolved in a single or mixed solvent, such as water, methanol, ethanol, N,N-dimethylformamide or a mixture of two or more thereof, and then added to the emulsion.

The first recording material may contain in the image recording layer and/or another layer an antifoggant, a stabilizer and a precursor of stabilizer with the intention of preventing additional fog and a sensitivity drop upon storage.

Examples of an antifoggant, a stabilizer and a precursor of stabilizer which can be used include the thiazonium salts described in U.S. Pat. No. 2,131,038, the azaindenes described in U.S. Pat. No. 2,886,437, the mercury salts described in U.S. Pat. No. 2,728,663, and the urazoles described in U.S. Pat. No. 3,287,135. Further, the organic halides described in JP-A-50-119624 and JP-A-8-15809 can be favorably used as antifoggants.

These antifoggants and so on may be added to a coating solution in a state of solution, powder or solid fine-grain dispersion.

In the image recording layer and/or another layer, this recording material may contain benzoic acid compounds for the purpose of increasing the sensitivity and preventing fog.

Although various benzoic acid derivatives can be used for the foregoing purpose, the compounds described in U.S. Pat. No. 4,787,939 and JP-A-9-329865 are used to greater advantage. They are added to a coating solution in a state of powder, solution or fine-grain dispersion.

The addition amount of those benzoic acid compounds may be optional, but the appropriate amount is of the order of 1μ mole to 2 mole per mole of silver.

For the purposes of retarding or accelerating the development, heightening the spectral sensitizing efficiency, enhancing the storage property before and after the development and so on, a mercapto, disulfide or thione compound can be incorporated in the image recording layer and/or another layer of the first recording material.

The mercapto compound used, though it may have any structure, is preferably a compound represented by formula Ar—SM or Ar—S—S—Ar, wherein M is a hydrogen atom or an alkali metal atom and Ar is an aromatic single or condensed ring containing at least one nitrogen, sulfur, oxygen, selenium or tellurium atom. Examples of such a mercapto compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 4,5-diphenyl-2-imidazolethiol and 2-mercaptoimidazole.

The amount of mercapto compound added is desirably of the order of 0.001–1.0 mole per mole of silver.

With the intention of improving tone and preventing irradiation, the first recording material may contain various dyes and pigments in the image recording layer and/or another layer.

Any of dyes and pigments, e.g., those set forth in Color Index, will suffice for the foregoing purpose. Specifically, pyrazoloazole dyes, anthraquinone dyes, azo dyes, azomethine dyes, oxonol dyes, carbocyanine dyes, styryl dyes, triphenylmethane dyes, indoaniline dyes, indophenol dyes, organic pigments such as phthalocyanine, and inorganic pigments are usable, and they are added to a coating solution in a state of solution, emulsion or solid fine-grain dispersion, or after they are mordanted by a polymeric mordant.

The amount of dyes used is chosen depending on the desired absorption rate, but it is generally of the order of 1 μg to 1 g per liter.

In addition to the above-recited constituents, the recording material may contain in the image recording layer and/or another layer a plasticizer and a lubricant (e.g., glycerines and diols as described in U.S. Pat. No. 2,960,404), a superhigh-contrast agent (e.g., the hydrazine derivatives described in JP-A-9-304872), a high contrast accelerator (e.g., the onium salts described in JP-A-9-297368) and a hardener (e.g., the polyisocyanates described in JP-A-6-208193).

In addition to the image forming layer, this recording material may have various layers.

For instance, a surface protective layer may be formed with the intention of protecting the image forming layer and preventing adhesion. In forming the surface protective layer, an adhesion preventing material, such as wax, silica particles, a styrene-containing elastomeric block copolymer (e.g., a styrene-butadiene-styrene block copolymer), cellulose acetate, cellulose acetate butyrate or cellulose propionate, can be utilized.

Further, an antihalation layer may be formed.

It is desirable for the antihalation layer to have the maximal absorption of 0.3 to 2 in the desired wavelength region and, after processing, to have absorption of 0.001 to 0.5 in the visible region.

The dyes used as antihalation dyes may be any compounds so far as they have the intended absorption in the desired wavelength region, show sufficiently low absorption in the visible region after processing and provide the desirable absorbance spectral form desired for the antihalation layer. The dyes disclosed as antihalation dyes include the following ones, but the following should not be construed as limiting the antihalation dyes usable herein. Examples of a dye used independently include the compounds disclosed in JP-A-7-11432 and JP-A-7-13295, and those of a dye which is decolored by processing include the compounds disclosed in JP-A-52-139136 and JP-A-7-199409.

For the recording material having the foregoing image forming layer on one side of a support, it is desirable to further have a backing (back coat) layer on the other side of the support.

To the backing layer, a matting agent may be added with the intention of improving the transporting properties. In general, the matting agent is made up of fine particles of a water-insoluble organic or inorganic compound. Suitable examples of such an organic compound include a water-dispersible vinyl polymer such as polymethylmethacrylate, methyl cellulose, carboxyl starch and carboxynitrophenyl starch, and those of such an inorganic compound include silicon dioxide, titanium dioxide, magnesium dioxide, aluminum oxide and barium sulfate.

The matting agent has no particular limitation on the size and shape. However, it is desirable to use a matting agent having a grain diameter of 0.1 to 30 $\mu$m. The matte degree of the backing layer is desirably 250 to 10 seconds, expressed in terms of Bekk smoothness.

As a binder for forming the backing layer, various kinds of colorless transparent or translucent resins can be employed. Examples of such a resin include gelatin, gum arabic, polyvinyl alcohol, hydroxyethyl cellulose, cellulose acetate, cellulose acetate butyrate, casein, starch, poly(meth) acrylic acid, polymethylmethacrylic acid and polyvinyl chloride.

Also, it is desirable for the backing layer to have the maximal absorption of 0.3 to 2 in the desired wavelength region and, if desired, such an antihalation dye as used in the foregoing antihalation layer may be added to the backing layer.

The first recording material may have the backside resistive heating layer disclosed in U.S. Pat. No. 4,460,681 or U.S. Pat. No. 4,374,921 on the same side as the backing layer.

In addition to the foregoing various layers, this recording material may further have an antistatic or conductive layer using a soluble salt (e.g., chloride, nitrate), a metal-evaporated layer, a layer containing the ionic polymer disclosed in U.S. Pat. No. 2,861,056 and a layer containing the insoluble inorganic salt disclosed in U.S. Pat. No. 3,428,451.

As other examples of a recording material applicable to an apparatus according to the present invention, mention may be made of the following light- and heat-sensitive recording materials.

One of these light- and heat-sensitive recording materials (hereinafter referred to as "a second recording material") is a recording material having a light- and heat-sensitive recording layer on a support, and the light- and heat-sensitive recording layer contains an electron-donating colorless dyes encapsulated in heat-responsive microcapsules and, outside the heat-responsive microcapsules, a compound having both an electron-accepting part and a polymerizable vinyl monomer part in a molecule, and a photopolymerization initiator.

Another light- and heat-sensitive recording material (hereinafter referred to as "a third recording material") is a recording material having a light- and heat-sensitive recording layer on a support, and the light- and heat-sensitive recording layer contains an electron-donating colorless dyes encapsulated in heat-responsive microcapsules and, outside the heat-responsive microcapsules, an electron-accepting compound, a polymerizable vinyl monomer and a photopolymerization initiator.

When these recording materials are exposed to light, the composition present outside the heat-responsive microcapsules (hereinafter referred to as "the photosetting composition") undergoes curing and setting, and upon heating the compound having both electron-accepting part and polymerizable vinyl monomer part or the electron-accepting compound which has mobility (remains unset) moves about the light- and heat-sensitive layer and meets with an electron-donating colorless dye in microcapsules; as a result, a color develops from the colorless dye to form an image.

The compound having an electron-accepting part and a polymerizable vinyl monomer part which is used in the photosetting composition of the second recording material is a compound having both electron-accepting group and vinyl group in a molecule.

Suitable examples of such a compound include styrenesulfonylaminosalicylic acid, vinylbenzyloxyphthalic acid, zinc β-(meth)acryloxyethocysalicylate, hydroxyethyloxybenzoic acid, β-(meth)acryloxyethylorsellinate, β-(meth) acryloxyethoxyphenol, β-(meth)acryloxyethyl-β-resorcinate, hyroxystyrenesulfonic-acid-N-ethylamide, β-(meth)acryloxypropyl-p-hydroxybenzoate, (meth) acryloxymethylphenol, (meth)acrylamidopropanesulfonic acid, β-(meth)acryloxyethoxydihydroxybenzene, γ-styrenesulfonyloxy-β-(meth)acryloxypropanecarboxylic acid, β-(meth)acryloxypropyl-β-hydroxyethyloxysalicylic acid, β-hydroxyethoxycarbonylphenol, 3,5-distyrenesulfonamidophenol, (meth)acryloxyethoxyphthalic acid, (meth)acrylic acid, (meth) acryloxyethoxyhydroxynaphthoic acid, β-(meth) acryloxyethyl-p-hydroxybenzoate, β-(meth)acryloxyethyl-β-resorcinate, β-(meth) acryloxyethyloxycarbonylhydroxybenzoic acid, and metal salts (e.g., zinc salts) of the above-recited compounds.

These compounds can also be favorably used as polymerizable vinyl monomers to constitute the photosetting composition of the third recording material.

In addition to those compounds, various monomers having at least one vinyl group per molecule can be used as a polymerizable vinyl monomer to constitute the third recording material. For example, (meth)acrylic acid and salts thereof, (meth) acrylic acid esters and (meth)acrylamides; maleic anhydride and maleic acid esters; itaconic acid and itaconic acid esters; styrenes; vinyl ethers and vinyl esters; N-vinyl heterocyclic compounds; allyl ethers and allyl esters; and so on can be used. In particular, monomers having two or more vinyl groups per molecule are preferred over the others, with examples including (meth) acrylic acid esters of polyhydric alcohols, (meth) acrylic acid esters of polyhydric phenols and those of bisphenols, epoxy resins having terminal (meth)acrylate groups and polyesters having terminal (meth) acrylate groups. More specifically, those monomers include ethylene glycol diacrylate, ethylene glycol dimethacrylate, trimethylolpropane triacrylate, pentaerythritol tetraacrylate, dipentaerythritol hydroxypentaacrylate, hexanediol-1,5-dimethacrylate and diethylene glycol dimethacrylate.

The suitable molecular weight of those monomers is of the order of about 100 to about 5,000.

The photopolymerization initiator used in the second recording material and the third recording material (collectively referred to as "the recording material", hereinafter) is a compound capable of initiating the photopolymerization the foregoing vinyl monomers, preferably including salt compounds of organoborates which have sensitivities in the green and red to infrared wavelength regions and, when they are used in combination with dyes capable of absorbing green and red to infrared rays of light, can produce free radicals upon irradiation with light (See JP-A-62-143044), more preferably cationic dye salts of organoborates.

The salts compounds of organoborates produce free radicals in response to an irradiated laser beam, and these radicals initiate the polymerization of the aforementioned vinyl monomer part.

The compounds represented by the following formula (1) can be used as those salt compounds of organoborates:

(1)

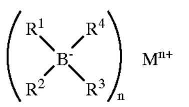

wherein M represents a cation selected from the group consisting of alkali metal atoms, quaternary ammonium, pyridinium. quinolinium, diazonium, morpholinium, tetrazolium, acridinium, phosphonium, sulfonium, oxosulfonium, sulfur, oxygen, carbon, halogenium, Cu, Ag, Hg, Pd, Fe, Co, Sn, Mo, Cr, Ni, As and Se; n is an integer of 1 to 6; $R^1$, $R^2$, $R^3$ and $R^4$ each represent a halogen atom, a substituted or unsubstituted alkyl group, a substituted or unsubstituted alkenyl group, a substituted or unsubstituted alkinyl group, an alicyclic group, a substituted or unsubstituted aryl group, a substituted or unsubstituted alkylaryl group, a substituted or unsubstituted aryloxyl group, a substituted or unsubstituted aralkyl group, a substituted or unsubstituted heterocyclic group, or a substituted or unsubstituted silyl group. Herein, $R^1$, $R^2$, $R^3$ and $R^4$ may be the same or different, and two or more of them may combine to form a cyclic structure. Examples of an organoborate anion in the foregoing formula (1) include tetraethylborate, triisobutylborate, di-n-butyl-di-t-butylborate, tetraphenylborate, tetra-p-chlorophenylborate, tri-m-chlorophenyl-n-hexylborate, triphenylethylborate, trimethylbutylborate, tritolylisopropylborate, triphenylbenzylborate, tetraphenylborate, tetrabenzylborate, triphenylphenetylborate, triphenyl-p-chlorobenzylborate, di(α-naphthyl)-dipropylborate, triphenylsilyltriphenylborate, tritoluylsilylphenylborate and tri-n-butyl(dimethylphenylsilyl)borate.

Examples of a salt compound of an organoborate represented by formula (1) are illustrated below.

(1)

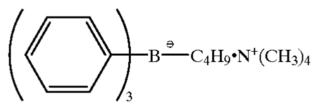

(2)

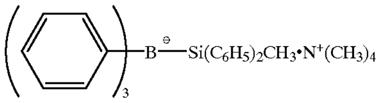

(3)

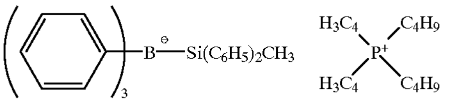

(4)

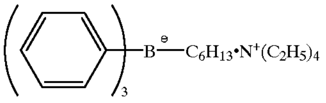

(5)

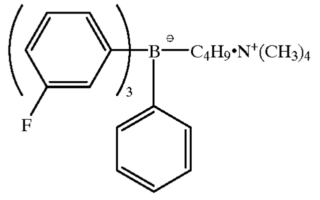

(6)

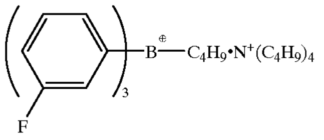

(7)

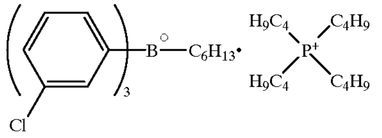

(8)

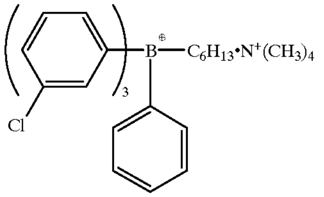

For heightening the absorption efficiency of light (recording light L), it is desirable that those salt compounds of organoborates represented by formula (1) be used in combination with spectral sensitizing dyes which can absorb light in the green to red region and the infrared region.

In particular, organic cationic dyes having their absorption maxima in the wavelength region of 500 to 1100 nm are advantageously used as spectral sensitizing dyes, with examples including cationic methine dyes, cationic carbonium dyes, cationic quinoneimine dyes, cationic indoline dyes and cationic styryl dyes. More specifically, the cationic methine dyes include polymethine dyes, cyanine dyes and azomethine dyes, preferably cyanine, carbocyanine, dicarbocyanine, tricarbocyanine and hemicyanine dyes; the cationic carbonium dyes include triarylmethane dyes, xanthene dyes and acridine dyes, preferably rhodamine; the cationic quinoneimide dyes preferably include azine dyes, oxazine dyes, thiazine dyes, quinoline dyes and thiazole dyes. These cationic dyes can be used alone or as a mixture of two or more thereof.

More preferably, the cationic dye salts of organoborates, which can be represented by the following formula (2), are used as photopolymerization initiator:

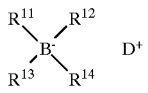

(2)

wherein $D^+$ represents a cationic dye, and $R^{11}$, $R^{12}$, $R^{13}$ and $R^{14}$ each represent a halogen atom, a substituted or unsubstituted alkyl group, a substituted or unsubstituted aryl group, a substituted or unsubstituted aralkyl group, a substituted or unsubstituted alkylaryl group, a substituted or unsubstituted alkenyl group, a substituted or unsubstituted alkinyl group, a substituted or unsubstituted aryloxy group, a substituted or unsubstituted alicyclic group, a substituted or unsubstituted heterocyclic group, a substituted or unsubstituted allyl group, or a substituted or unsubstituted silyl group. Herein, $R^{11}$, $R^{12}$, $R^{13}$ and $R^{14}$ may be the same or different, and two or more of them may combine to form a cyclic structure.

The cationic dye represented by $D^+$ in the foregoing formula (2) acts as a spectral sensitizing dye, and it is specifically an organic cationic dye having its absorption peak(s) at wavelengths of no shorter than 500 nm, especially in the wavelength region of 500 to 1100 nm.

Examples of such an organic cationic dye include cationic methine dyes, cationic carbonium dyes, cationic quinoneimine dyes, cationic indoline dyes and cationic styryl dyes. More specifically, the suitable cationic methine dyes include polymethine dyes, cyanine dyes and azomethine dyes, preferably cyanine, carbocyanine, dicarbocyanine, tricarbocyanine and hemicyanine dyes; the suitable cationic carbonium dyes include triarylmethane dyes, xanthene dyes and acridine dyes, preferably rhodamine; the suitable cationic quinoneimide dyes include azine dyes, oxazine dyes, thiazine dyes, quinoline dyes and thiazole dyes.

The borate anions which can be favorably used for formula (2) include the same ones as recited in the illustration of formula (1).

Examples of a cationic dye salt of an organoborate represented by formula (2) are illustrated below:

(1)

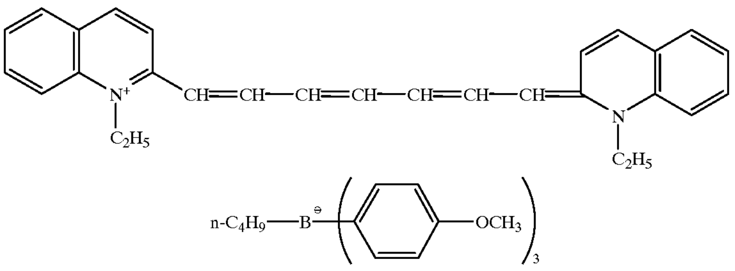

(2)

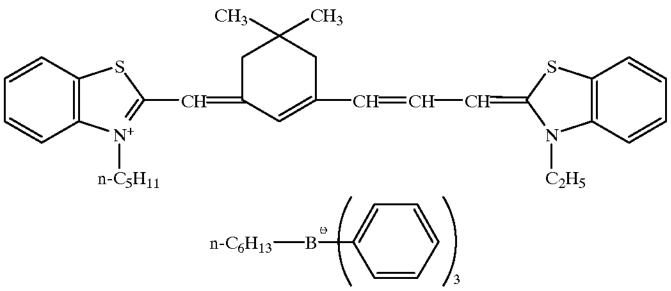

-continued
(3)
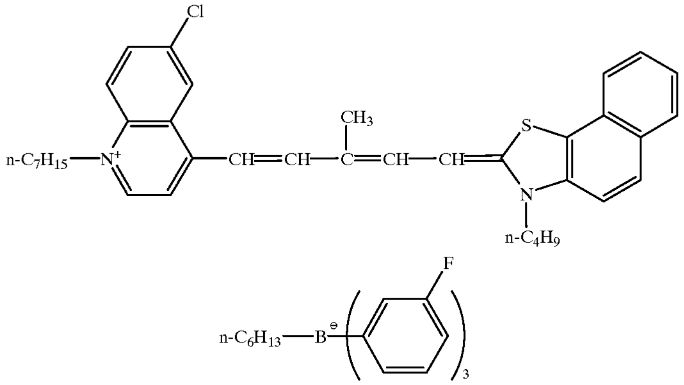
(4)
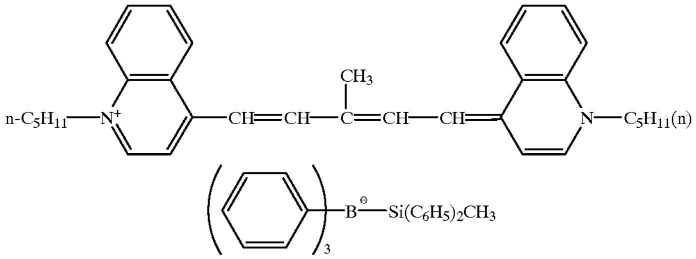
(5)
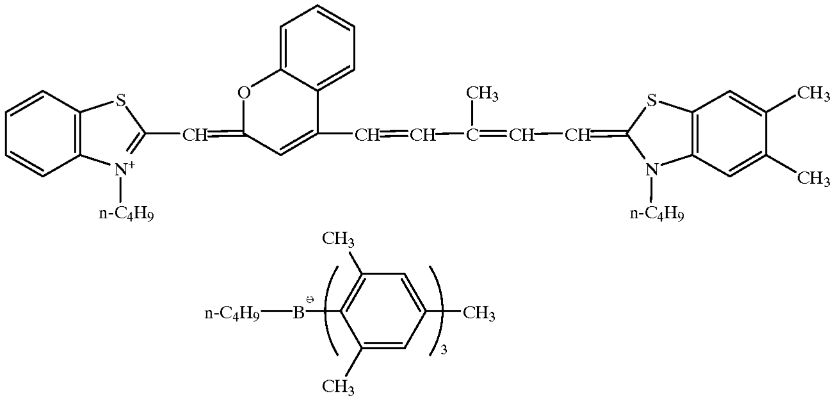
(6)
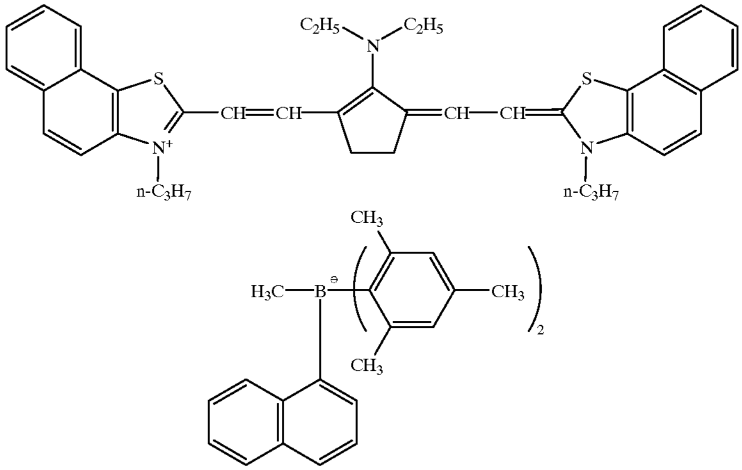

The suitable amount of a photopolymerization initiator used is from 0.01 to 20 weight %, based on the total weight of the photosetting composition (outside the heat-responsive microcapsules).

In this recording material, the compound having an active halogen radical in a molecule represented by the following formula (3) or (4) can be used as an assistant in combination with the foregoing photopolymerization initiator and spectral sensitizing dyes:

(3)

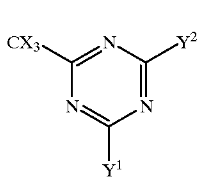

wherein X represents a halogen atom, $Y^1$ represents —$CX_3$, —$NH_2$, —NHR, —$NR_2$ or —OR (wherein R represents an alkyl group, a substituted alkyl group, an aryl group or a substituted aryl group), and $Y^2$ represents —$CX_3$, an alkyl group, a substituted alkyl group, an aryl group, a substituted aryl group or a substituted alkenyl group. The substituent for the group represented by $Y^1$ or $Y^2$ has may be the compound of formula (3) itself;

(4)

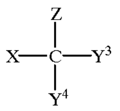

wherein X represents a halogen atom, $Y^3$ and $Y^4$, which may be the same or different, each represents a hydrogen atom or a halogen atom, and Z represents a group of the following formula,

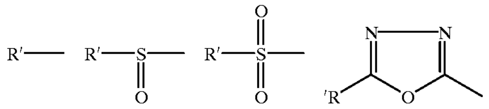

wherein R' represents a hydrogen atom, a halogen atom, an alkyl group, a substituted alkyl group, an aryl group, a substituted aryl group, a substituted alkenyl group, a heterocyclic group or a substituted heterocyclic group.

Of the compounds represented by formula (3), the compounds having —$CX_3$ as $Y^1$ are used to advantage.

Suitable examples of a compound represented by formula (3) include 2-phenyl-4,6-bis(trichloromethyl)-s-triazine, 2-(p-chlorophenyl)-4,6-bis(trichloromethyl)-s-triazine, 2-(p-methoxyphenyl)-4,6-bis(trichloromethyl)-s-triazine, 2,4,6-tris(trichloromethyl)-s-triazine, 2-(p-cyanophenyl)-4,6-bis(trichloromethyl)-s-triazine, and 2-(p-acetylphenyl)-4,6-bis(trichloromethyl)-s-triazine.

On the other hand, examples of a compound represented by formula (4) include carbon tetrachloride, carbon tetrabromide, iodoform, p-nitro-α,α,α-tribromoacetophenone, ω,ω,ω-tribromoquinaldine, tribromomethylphenylsulfone and trichloromethylsulfone.

It is desirable that the compound represented by formula (3) or (4) be added in an amount of 0.01 to 20 mole per mole of spectral sensitizing dye (cationic dye).

Although it has high sensitivity and spectral sensitivities in the infrared region, this recording material may further contain as the assistant for acceleration of the latent-image formation a reducing agent, such as an oxygen scavenger and an active hydrogen donor chain transfer agent, and other compounds.

Examples of an oxygen scavenger which is known to be effective as the assistant for acceleration of latent-image formation include phosphine, phosphonate, phosphite, stannous salts, and other compounds which are liable to be oxidized by oxygen, such as N-phenylglycine, trimethylbarbituric acid and N,N-dimethyl-2,6-diisopropylaniline.

The photosetting composition of the third recording material is admixed an electron-accepting compound. To the photosetting composition of the second recording material may be added an electron-accepting compounds, if desired. Thereby, the developed color density can be heightened.

Examples of an electron-accepting compound include phenol derivatives, salicylic acid derivatives, metal salts of aromatic carboxylic acids, acid clay, bentonite, novolak resins, metal-treated novolak resins and metal complexes. Additionally, examples of a phenol derivative include 2,2'-bis(4-hydroxyphenyl)propane, 4-t-butylphenol, 4-phenylphenol, 4-hydroxydipheninoxide, 1,1'-bis(3-chloro-4-hydroxyphenyl)cyclohexane and 1,1'-bis(3-chloro-4-hydroxyphenyl)-2-ethylbutane; while those of a salicylic acid derivative include 4-pentadecylsalicylic acid, 3,5-di(α-methylbenzyl) salicylic acid, 3,5-di(tert-octyl) salicylic acid, 5-octadecylsalicylic acid, 5-α-(p-α-methylbenzylphenyl) ethylsalicylic acid, 3-α-methylbenzyl-5-tert-octylsalicylic acid and 5-tetradecylsalicylic acid.

It is desirable for such an electron-accepting compound to be used in a proportion of about 5 to about 1,000 weight % to the electron-donating colorless dye.

To the photosetting composition used in the aforementioned recording materials may further be added a photo-crosslinking composition, such as polyvinyl cinnamate, polycinnamylidenevinyl acetate and a photosetting composition having an α-phenylmaleimido group. On the other hand, these photo-crosslinking compositions may be used as a photosetting constituent.

Furthermore, with the intention of preventing the photosetting composition from undergoing thermal and aging polymerization to enhance the stability, a thermal polymerization inhibitor may be added to the photosetting composition, if desired.

Suitable examples of a thermal polymerization inhibitor include p-methoxyphenyl, hydroquinone, t-butylcatechol, pyrogallol, 2-hydroxybenzophenone, 4-methoxy-2-hydroxybenzophenone, cuprous chloride, phenothiazine, chloranil, naphthylamine, β-naphthol, 2,6-di-t-butyl-p-cresol, nitrobenzene, dinitrobenzene, picric acid and p-toluidine. It is desirable for such a thermal polymerization inhibitor to be added in a proportion of the order of 0.001–5 weight % to the total photosetting composition.

The photosetting composition is dispersed in an emulsion state, and incorporated into a light- and heat-sensitive recording layer.

Examples of a solvent usable for the emulsified dispersion of the photosetting composition include cotton seed oil, kerosene, aliphatic ketones, aliphatic esters, paraffin, naphthene oil, alkylated biphenyls, chlorinated paraffin, diarylethanes such as 1,1'-ditolylethane, alkyl esters of phthalic acid such as dibutyl phthalate, phosphoric acid esters such as diphenyl phosphate, citric acid esters such as tributyl acetylcitrate, benzoic acid esters such as octyl benzoate, alkylamides such as diethyllaurylamide, acetic acid esters such as ethyl acetate, acrylic (methacrylic) acid esters such as methyl acrylate, alkyl halides such as methylene chloride and carbon tetrachloride, methyl isobutyl ketone, α-ethoxyethylacetate, and methyl cellosolve acetate. Of these solvents, aliphatic esters and alkyl halides, especially those having the solubility of not more than 10 volume % in water, are preferred over the others.

Those solvents are used in a proportion of 1 to 500 parts by weight to the photopolymerizable compound.

The water-soluble polymers usable for the emulsified dispersion of the photosetting composition are preferably compounds which are dissolved in 25° C. water in a concentration of at least 5 weight %. Examples of suchapolymer include proteins, such as gelatin, gelatin derivatives and albumin, cellulose derivatives such as methyl cellulose, sugar derivatives such as starch (including denatured starch), and synthetic polymers such as polyvinyl alcohol, hydrolysis products of a styrene-maleic anhydride copolymer, carboxyl-modified polyvinyl alcohol, polyacrylamide, saponified products of a vinyl acetate-polyacrylic acid copolymer and polystyrenesulfonate. In particular, gelatin and polyvinyl alcohol are used to advantage.

As the electron-donating colorless dye, which is encapsulated in the microcapsules of the light- and heat-sensitive recording layer of the recording material, can be used various known colorless dyes, including triphenylmethane phthalide compounds, fluoran compounds, phenothiazine compounds, indolyl phthalide compounds, leuco Auramine compounds, Rhodamine lactam compounds, triphenylmethane compounds, triazene compounds, spiropyran compounds and fluorene compounds.

More specifically, examples of a triphenylmethane phthalide compounds include 3,3-bis(p-dimethylaminophenyl)-6-dimethylamonophthalide and 3-(p-dimethylaminophenyl)-3-(2-methylindol-3-yl)phthalide; examples of a leuco Auramine compound include N-halophenyl-leuco-Auramine and N-2,4,5-trichlorophenyl-leuco-Auramine; examples of a Rhodamine lactam compound include Rhodamine B anilinolactam and Rhodamine (p-nitrilo) lactam; examples of a fluoran compound include 2-(dibenzylamino)fluoran, 2-anilino-3-methyl-6-diethylaminofluoran and 2-anilino-3-methyl-6-N-methyl-N-cyclohexylaminofluoran; examples of a phenothiazine compound include benzoyl leuco Methylene Blue and p-nitrobenzyl leuco Methylene Blue; and examples of a spiropyran compound include 3-methyl-spiro-dinaphthopyran and 3,3'-dichloro-spiro-dinaphthopyran.

When this recording material is designed for full-color recording, U.S. Pat. No. 4,900,149 can be referred to for details of electron-donating colorless dyes to develop cyan, magenta and yellow colors respectively, U.S. Pat. No. 4,800,148 can be referred to for details of those of yellow color-forming type, and JP-A-63-53542 can be referred to for details of those of cyan color-forming type.

The microencapsulation of such an electron-donating colorless dye can be effected using methods known in the art.

For instance, the method of utilizing the coacervation of a hydrophilic wall-forming material as disclosed in U.S. Pat. No. 2,800,457, the interfacial polymerization method disclosed in JP-B-42-771, the method of utilizing the polymer deposition as disclosed in U.S. Pat. No. 3,660,304, the method of using an isocyanate polyol wall material as disclosed in U.S. Pat. No. 3,796,669, the method of using an isocyanate wall material as disclosed in U.S. Pat. No. 3,914,511, and the method of using a wall forming material of ureaformaldehyde-resorcinol type as disclosed in U.S. Pat. No. 4,089,802 can be adopted. In particular, it is desirable that a core material be first emulsified and then a polymer film be formed as a microcapsule wall.

In particular, the method of microencapsulation by polymerization of a reactant from the interior of oil droplets is used to advantage because it can form microcapsules uniform in particle diameter and ensure excellent keeping quality in the recording material.

For instance, in the case of using polyurethane as a wall material, a polyisocyanate and the second substance (e.g., a polyol or a polyamine) which can form a capsule wall by reacting with the polyisocyanate are mixed in an oily liquid to be encapsulated, and the resulting liquid is dispersed into water in an emulsified state and then heated. As a result, polymer forming reaction is caused at the surface of oil droplets and forms a microcapsule wall. Therein, an auxiliary solvent having a low boiling temperature and a strong dissolving power can be used in the oily liquid.

Various polyisocyanates used in the production of known urethane resins can be utilized as those for the foregoing case, and examples thereof include m-phenylenediisocyanate, 2,6-tolylenediisocyanate, 2,4-tolylenediisocyanate, diphenylmethane-4,4-diisocyanate, xylylene-1,4-diisocyanate, 4,4'-diphenylpropanediisocyanate and trimethylenediisocyanate, hexamethylenediisocyanate. Additionally, those polyisocyanates can form high molecular substances by reacting with water, too.

As for the polyols also, various polyols used in the production of known urethane resins, including aliphatic polyhydric alcohols, aromatic polyhydric alcohols, hydroxypolyesters and hydroxypolyalkylene ethers, can be utilized. More specifically, ethylene glycol, 1,3-propanediol, 1,4-butanediol, 1,5-pentanediol, 1,6-hexanediol, propylene glycol, 2,3-dihydroxybutane, 1,2-dihydroxybutane, 2,5-hexanediol, 3-methyl-1,5-pentanediol, dihydroxycyclohexane and the like can be used as the polyols for the foregoing case. Additionally, it is desirable for the polyol to be used in such an amount that the ratio of the hydroxyl group to the isocyanate group is of the order of 0.02 to 2 by mole.

Examples of a polyamine which can be used in the foregoing case include ethylenediamine, trimethylenediamine, tetramethylenediamine, pentamethylenediamine, hexamethylenediamine, p-(m-) phenylenediamine, piperazine and its derivatives, 2-hydroxytrimethylenediamine, diethyltriamine, triethylenetriamine, triethylenetetramine, tetraethylenepentamine and amine adducts of epoxy compounds.

Also, microcapsules can be formed using a water-soluble high molecular compound. This water-soluble high molecular compound may be any of water-soluble anionic, nonionic and amphoteric high molecular compounds.

Examples of a water-soluble anionic high molecular compound include high molecular compounds having —COO— or $—SO_2—$ groups, such as gum arabic, alginic acid, sulfated starch, sulfated cellulose, gelatin derivatives such as phthaloylated gelatin, acrylic (methacrylic) acid (co) polymers, vinylbenzenesulfonic acid (co)polymers and carboxyl-modified polyvinyl alcohol. Examples of a water-soluble nonionic high molecular compound include polyvinyl alcohol, hydroxyethyl cellulose and methyl cellulose. As an example of a water-soluble amphoteric high molecular compound, mention may be made of gelatin. Of those water-soluble high molecular compounds, gelatin, gelatin derivatives and polyvinyl alcohol are preferred over the others.

Those water-soluble high molecular compounds are used as a 0.01 to 10 weight % aqueous solution.

The microcapsules in this recording material have an average diameter of 20 μm or below, and the average diameter of 5 μm or below is especially desirable for them from the viewpoint of resolution. When the diameter of each microcapsule is too small, the ratio of the surface area to the definite solids content becomes too great; as a result, a large quantity of wall material is required. Therefore, the average diameter of microcapsules is preferably at least 0.1 μm.

The electron-donating colorless dyes may be present in a state of solution in microcapsules, or in a state of solid.

The former state can be brought about by dissolving an electron-donating colorless dye in a solvent and microencapsulating the dye in the dissolved condition. The suitable proportion of the solvent used therein is from 1 to 500 parts by weight per 100 parts by weight of the electron-donating colorless dye. The solvent used at the time of the microencapsulation can be the same as used for emulsification of the aforementioned photosetting composition. In addition, volatile solvents such as acetate solvents may be used as an auxiliary solvent for dissolving electron-donating colorless dyes at the time of microencapsulation.

Besides the light- and heat-sensitive recording layer, the recording material may have various layers such as a protective layer and an interlayer. To the protective layer, the addition of a matting agent is desirable.

Examples of a matting agent usable for the protective layer include inorganic particles, such as those of silica, magnesium oxide, barium sulfate and strontium sulfate; resin particles, such as those of polymethylmethacrylate, polyacrylonitrile and polystyrene; and starch particles, such as those of carboxystarch and corn starch. In particular, polymethylmethacrylate particles and silica particles are preferred as the matting agent. As for the silica particles, Syloid A series produced by FUJI-DEVISON CHEMICAL LTD. Ltd. are usable.

The suitable particle diameter of a matting agent is from 1 to 20 μm, and the addition amount thereof is preferably from 2 to 500 $mg/m^2$.

In each of the constituent layers of the recording material, including light- and heat-sensitive layers, interlayers and protective layers, it is desirable to use a hardener. In particular, it is preferable to add a hardener to the protective layer and thereby to decrease the tackiness of the protective layer.

For instance, the useful hardeners are "gelatin hardeners" used for the production of photographic materials. Suitable examples of such a gelatin hardener include chromium alum, zirconium sulfate, boric acid, 1,3,5-triacryloyl-hexahydro-s-triazine, 1,2-bisvinylsulfonylmethane, 1,3-bis(vinylsulfonylmethyl)propanol-2, bis(α-vinylsulfonylacetamido)ethane, sodium salt of 2,4-dichloro-6-hydroxy-s-triazine and 2,4,6-triethylenimino-s-triazine.

The suitable proportion of a hardener in each constituent layer is of the order of 0.5 to 5 weight % to the binder.

To the protective layer, colloidal silica may be added in order to further decrease its tackiness.

Examples of usable colloidal silica include Snowtex 20, Snowtex 30, Snowtex C, Snowtex O and Snowtex N, produced by Nissan Chemicals Industries, Ltd. The suitable proportion of colloidal silica therein is of the order of 5 to 80 weight % to the binder.

To the protective layer, a fluorescent brightening agent for heightening the whiteness of the recording material and a blue dye as a blueing agent may further be added.

When this recording material is designed for a multicolor recording material, the recording material may have a multilayer structure wherein one layer differs from another layer in the hue of color developed from microencapsulated electron-donating colorless dye and the wavelength of light to which the photosetting composition has the sensitivity, and optionally an interlayer containing a filter dye may be arranged between different light- and heat-sensitive layers.

The interlayer contains a binder and a filter dye as main components, and can further contain additives such as a hardener and a polymer latex.

The filter dyes which can be used in the present recording material can be dispersed in an emulsified state using an oil-in-water dispersion method or a polymer dispersion method, and added to the intended layers, especially interlayers. According to the oil-in-water dispersion method, a filter dye is first dissolved in either a high boiling organic solvent having a boiling point of at least 175° C. or the so-called auxiliary solvent having a boiling point of 30° C. to 160° C., or in a mixture of these solvents and then finely dispersed into an aqueous medium, such as water or an aqueous solution of gelatin or polyvinyl alcohol, in the presence of a surfactant.

The processes of a latex dispersion method and examples of a latex for hardening and impregnation are described in U.S. Pat. No. 4,199,383. Suitable examples of a latex include latexes obtained by copolymerizing acrylic acid (methacrylic acid) esters, such as ethyl acrylate, and acid monomers, such as acrylic acid.

Examples of a binder which can be used in each constituent layer of the recording material, such as a protective layer, a light- and heat-sensitive layer or an interlayer, include water-soluble high molecular compounds which can be used for emulsifying dispersion of a photosetting composition and microencapsulation of an electron-donating colorless dye. Further, they include solvent-soluble polymers, such as polystyrene, polyvinyl formal, polyvinyl butyral, polyvinyl alcohol, acrylic resins (e.g., polymethylmethacrylate), phenol resins, ethyl cellulose, epoxy resins, urethane resins, and latexes of these polymers. Of these binders, gelatin and polyvinyl alcohol are preferred over the others.

In each constituent layer of the recording material, various surfactants may be used for various purposes, e.g., as a coating aid, and for prevention of electrification, improvement of slippability, emulsifying dispersion, prevention of adhesion, and so on.

As surfactants, for example, nonionic surfactants, such as saponin, polyethylene oxides and derivatives thereof, alkylsulfonates, alkylsulfates, N-acyl-N-alkyltaurines and sulfosuccinates, various anionic surfactants, amphoteric surfactants, such as alkylbetaines and alkylsulfobetaines, and cationic surfactants, such as aliphatic or aromatic quaternary ammonium salts, can be used, if needed.

In addition to the additives mentioned above, dyes for prevention of irradiation and halation, ultraviolet absorbents, plasticizers, fluorescent brightening agents, coating aids, curing agents, antistatic agents and slippability improvers may be added, if needed.

The first recording material having the aforementioned characteristic image forming layer, and the second and third recording materials having the aforementioned light- and heat-sensitive recording layers can be produced by preparing coating compositions (emulsions) using ingredients for individual constituent layers and, if needed, solvents as well, and coating those compositions using known means and then drying them.

As such solvents, various solvents known to be usable for recording materials can be employed, with examples including water, alcohols such as ethanol and isopropanol, halogen-containing solvents such as ethylene chloride, ketones such as cyclohexanone and methyl ethyl ketone, esters such as methyl cellosolve acetate and ethyl acetate, toluene and xylene. These solvents maybe used as amixture of two ormore thereof, if desired. Further, various surfactants, including nonionic, anionic, cationic and fluorine-containing surfactants, may be added to the coating compositions with the intention of improving the coatability and the electrifying properties.

As the coating means, known means such as a blade coater, a rod coater, a knife coater, a roll doctor coater, a reverse roll coater, a transfer roll coater, a gravure coater, a kiss roll coater and a curtain coater can be employed. Additionally, the amount of each coating composition coated is adjusted, of course, so that the amount of each layer attached after drying will be a predetermined amount.

In addition, these recording materials have no particular restriction as to the support to be a constituent thereof, but various supports used for general recording materials can be employed therein also. Examples of a usable support include resin films such as a polyester film, a polyethylene terephthalate film, a polyethylene naphthalate film, a cellulose nitrate film, a cellulose ester film, a polyvinyl acetal film and a polycarbonate film, and sheets of various metals, such as aluminum and zinc, glass and paper.

The present invention will now be illustrated in more detail by reference to an example. In this example, the first recording material is employed.

EXAMPLE

Preparation of Organic Silver Salt Dispersion:

Behenic acid and stearic acid in amounts of 40 g and 7.3 g respectively, and 500 ml of water were mixed with stirring for 15 minutes at 90° C., and thereto 187 ml of 1N NaOH was added over a 15-minute period. This mixture was further admixed with 61 ml of a 1N aqueous nitric acid, and the temperature was dropped to 50° C. Thereto, 124 ml of a 1N aqueous $AgNO_3$ solution was added over a 2-minute period, and the stirring was continued for 30 minutes. Thereafter, the solid matter was filtered with suction, and washed. This operation was repeated till the conductivity of the filtrate became 30 $\mu$S/cm. The thus obtained solid matter was not dried and treated as wet cake. This wet cake was admixed with polyvinyl alcohol (PVA-205, trade name) in an amount of 10 g per 100 g of the solid matter after drying, and further admixed with water in an amount to make the total weight 500 g. This mixture was subjected to preliminary dispersion using a homomixer.

Then, the pre-dispersed composition obtained above was processed three times with a dispersing machine (Microfluidizer M-110S-EH, trade name, made by Microfluidex International Corporation, wherein G10Z Interaction Chamber is used) under the pressure controlled to 1750 kg/cm$^2$. Thus, a dispersion of organic silver salt microcrystals having a volume weighted average diameter of 0.39 $\mu$m was prepared. The grain size determination was made with Master Sizer X made by Malvern Instruments Ltd.

Preparation of Silver Halide Grains:

A solution containing 22 g of phthaloylated gelatin and 30 mg of potassium bromide in 700 ml of water was adjusted to pH 5.0 at 40° C., and thereto 159 ml of an aqueous solution containing 18.6 g of silver nitrate and an aqueous solution of potassium bromide were added over a 10-minute period as the pAg was kept at 7.7 in accordance with the controlled double jet method. Thereto, 476 ml of an aqueous solution containing 55.4 g of silver nitrate and an aqueous solution containing 8 $\mu$m mole/l of dipotassium hexachloroiridate and 1 mole/l of potassium bromide were further added over a 30-minute period as the pAg was kept at 7.7 in accordance with the controlled double jet method. Then, the pH of the resulting solution was lowered to cause flocculation, thereby effecting a desalting treatment. The thus desalted matter was admixed with 0.1 g of phenoxyethanol, and adjusted to pH 5.9 and pAg 8.0. The thus prepared grains were cubic grains having the average size of 0.07 $\mu$m, the variation coefficient of 8% regarding the projected area diameter, and the (100) surface proportion of 86%.

The silver halide grains prepared above were heated up to 60° C., and thereto were added 85 $\mu$mole/mole silver of sodium thiosulfate, 11 $\mu$mole/mole silver of 2,3,4,5,6-pentafluorophenyldiphenylphosphine selenide, 2 $\mu$mole/mole silver of Tellurium Compound 1 illustrated below, 3.3 $\mu$mole/mole silver of chloroauric acid and 230 $\mu$mole/mole silver of thiocyanic acid. The resultant mixture was ripened for 120 minutes.

Thereafter, the temperature of the mixture was changed to 40° C., and admixed with $3.5\times10^{-4}$ mole/mole silver of the following sensitizing dye A with stirring. After a lapse of 5 minutes, the following Compound A was further added in an amount of $4.6\times10^{-3}$ mole per mole of silver halide, stirred for 5 minutes, and then quenched rapidly to 25° C., thereby preparing silver halide grains.

Sensitizing Dye A:

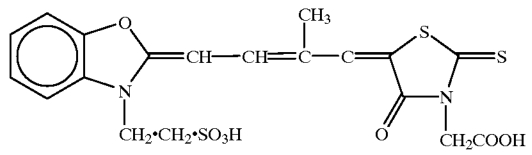

Compound A:

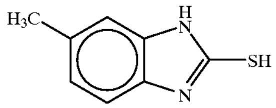

Tellurium Compound 1:

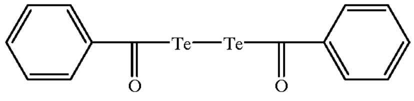

Preparation of Dispersions of Solid Fine-Particle Ingredients:

Solid fine-particle dispersions of tetrachlorophthalic acid, 1,1-bis(2-hydroxy-3,5-dimethylphenyl)-3,5,5-trimethylhexane and tribromomethylphenylsulfon respectively were prepared as follows:

To 2.5 g of tetrachlorophthalic acid were added 0.81 g of hydroxymethyl cellulose and 94.2 ml of water, and stirred thoroughly. The thus obtained slurry was allowed to stand for 10 hours. Thereafter, the slurry was placed in a vessel together with 100 ml of zirconia beads having an average diameter of 0.5 mm, and dispersed for 5 hours with a dispersing machine (1/4G Sand Grinder Mill, made by Imex Co., Ltd.) to prepare a solid fine-particle dispersion of tetrachlorophthalic acid. In this dispersion, 70 wt % of the total grains had a diameter of 1.0 $\mu$m or below.

The dispersions of the other ingredients were prepared in the similar manner to the above, except that the amount of a dispersing agent used and the dispersing time for obtaining the intended average grain diameter were changed properly.

Preparation of Fine-Particle Polymer Dispersion containing Dye:

The mixture of 2 g of the following Dye A, 6 g of methyl methacrylate/methacrylic acid (85/15) copolymer and 40 ml of ethyl acetate was made into a solution by heating to 60° C., and thereto was added 100 ml of an aqueous solution containing 5 g of polyvinyl alcohol. This mixture was finely dispersed for 5 minutes at 12,000 r.p.m. with a high-speed stirrer (Homogenizer, made by Nippon Seiki Co., Ltd.). Thus, the Dispersion P bf polymer fine particles having an average size of 0.3 μm was prepared.

Dye A:

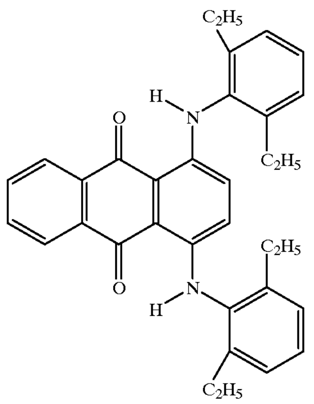

Preparation of Coating Composition for Emulsion Layer:

To the previously prepared dispersion of organic silver salt microcrystals (in an amount of 1 mole based on silver) were added the foregoing silver halide grains in a proportion of 10 mole % to the organic silver salt, the following binder, the following ingredients for development and the following dye, and thereby a coating composition for an emulsion layer was prepared. Binder: SBR latex, Laxter 3307B (a product of Dai-Nippon Ink & Chemicals, Inc.), in an amount of 430 g.

Ingredients for Development:

The foregoing dispersion of tetrachlorophthalic acid in an amount of 5 g, based on tetrachlorophthalic acid.

The foregoing dispersion of 1,1-bis(2-hydroxy-3,5-dimethylphenyl) -3,5,5-trimethylhexane in an amount of 98 g, based on this ingredient.

Phthalazine in an amount of 9.2 g.

The foregoing dispersion of tribromomethylphenylsulfone in an amount of 12 g, based on this ingredient.

4-Methylphthalic acid in an amount of 7 g.

Dye:

The foregoing fine-particle polymer dispersion containing Dye A in an amount of 4 g, based on the dye.

Additionally, Laxter 3307B used above is a styrene-butadiene copolymer latex, and the average diameter of dispersed particles is of the order of 0.1 to 0.15 μm.

Preparation of Coating Composition for Protective Layer on Emulsion Side:

To 10 g of inert gelatin were added 0.26 g of Surfactant A illustrated below, 0.09 g of Surfactant B illustrated below, 0.9 g of silica fine grains (average size: 2.5 μm), 0.3 g of 1,2-(bisvinylsulfonylacetamido)ethane and 64 g of water. Thus, a coating composition for protecting the emulsion surface was obtained.

Surfactant A:

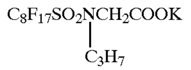

Surfactant B:

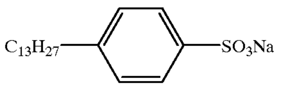

Preparation of Dye Dispersion:

The following Dye B in an amount of 0.8 g was added to 35 g of ethyl acetate, and dissolved therein with stirring. This solution was admixed with 85 g of a 6 weight % solution of polyvinyl alcohol (PVA-217), and stirred for 5 minutes with a homogenizer. Therefrom, the ethyl acetate was removed by evaporation, and the residue was diluted with water. Thus, a dye dispersion was prepared.

Dye B:

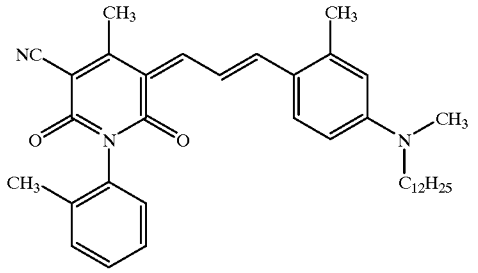

Preparation of Dispersion of Solid Fine-Particle Base:

To 26 g of the following solid base was added a 2 wt % of water solution of polyvinyl alcohol (PVA-215), and stirred thoroughly. The thus obtained slurry was allowed to stand for 10 hours. Thereafter, the slurry was placed in a vessel together with 100 ml of zirconia beads having an average diameter of 0.5 mm, and dispersed for 5 hours with a dispersing machine (1/4G Sand Grinder Mill, made by Imex Co., Ltd.) to prepare a dispersion of solid fine-particle base.

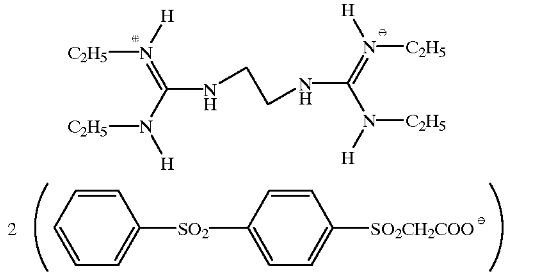

Preparation of Composition to be coated on Back Side:

To 38 g of a 10% gelatin solution were added 20 g of the previously prepared dye dispersion, 20 g of the dispersion of solid fine-particle base and 35 g of water, and used as a coating composition to be coated on the back side.

Preparation of Coating Composition for Protection of Back Side:

To 10 g of inert gelatin were added 0.26 g of the foregoing Surfactant A, 0.09 g of the foregoing Surfactant B, 0.3 g of 1,2-(bisvinylsulfonylacetamido)ethane, 0.4 g of very spherical silica having the average size of 12 μm (Sildex H121, trade name, a product of Dokai Chemical, Ltd.), and 64 g of water. Thus, a coating composition for protecting the back side was prepared.

Preparation of Photosensitive Material:

The Coating Composition prepared above for emulsion layer was coated on a 175 μm-thick polyethylene terephthalate support at a silver coverage of 2.2 $g/m^2$, and then the coating composition for protection of the emulsion surface was coated at a coverage of 1.8 g based on gelatin. After drying, the back-side coating composition prepared above was coated on the side opposite the emulsion layer at a coverage of 56 $mg/m^2$ based on Dye B. Further, the foregoing coating composition for protecting the back side was coated at a gelatin coverage of 1.8 $g/m^2$. Thus, a sample of the first recording material was produced.

The thus obtained recording material was loaded on the heat development apparatus 10 shown in FIG. 1, and the image formation therein was performed. As a result, high-quality images free from development streaks were obtained.

As illustrated above, the development streaks arising from non-uniform heating of recording materials can be diminished by the use of the present apparatus for recording on heat-developable photosensitive materials.

While the invention has been described in detail and with reference to specific embodiments thereof, it will be apparent to one skilled in the art that various changes and modifications can be made therein without departing from the spirit and scope thereof.

What is claimed is:

1. An apparatus for recording an image on a heat-developable photosensitive recording material or a light- and heat-sensitive recording material by dry processing, comprising:

latent image-forming means for forming a desired latent image on the recording material;

heat development means for heat-developing said latent image, the heat development means including a contact member having a surface which is brought into a contact with the recording material and a heat source for heating the contact surface;

transporting means for transporting the recording material in which the latent image is formed into the heat development means;

detection means for detecting the size of the recording material to be developed; and control means for controlling at least one of the latent image-forming means, the heat development means and the transporting means in order to extend a time interval between a time the recording material to be developed is transported into the heat development means and a time a preceding recording material was transported into the heat development means when the detection means detects that the recording material to be developed is different in size from the preceding recording material during continuous development of a plurality of recording materials.

2. The image recording apparatus set forth in claim 1, wherein the extended time interval corresponds to a time period of which the heat source regulates a temperature distribution of the contact surface.

3. The image recording apparatus set forth in claim 1, further comprising memory means for storing a plurality of time intervals to be set as the time interval in accordance with the size of the recording material detected by the detection means.

4. The image recording apparatus set forth in claim 1, wherein the operation speed of the transporting means is controlled so as to avoid a collision of succeeding recording materials.

5. The image recording apparatus set forth in claim 1, further comprising a timer for managing the time interval.

6. The image recording apparatus set forth in claim 1, wherein the contact member is made into a drum-like shape, and further comprising a counter for counting the rotation number of the drum-like contact member in order to manage the time interval.

7. The image recording apparatus set forth in claim 2, further comprising a temperature sensor for detecting the temperature distribution of the contact surface in order to manage the time interval.

* * * * *